(12) United States Patent
Chen et al.

(10) Patent No.: US 11,430,428 B2
(45) Date of Patent: Aug. 30, 2022

(54) METHOD, APPARATUS, AND STORAGE MEDIUM FOR SEGMENTING SENTENCES FOR SPEECH RECOGNITION

(71) Applicant: TENCENT TECHNOLOGY (SHENZHEN) COMPANY LIMITED, Shenzhen (CN)

(72) Inventors: Lianwu Chen, Shenzhen (CN); Jingliang Bai, Shenzhen (CN); Min Luo, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 154 days.

(21) Appl. No.: 17/016,573

(22) Filed: Sep. 10, 2020

(65) Prior Publication Data
US 2020/0410985 A1 Dec. 31, 2020

Related U.S. Application Data

(63) Continuation of application No. PCT/CN2019/098005, filed on Jul. 26, 2019.

(30) Foreign Application Priority Data

Aug. 2, 2018 (CN) .......................... 201810872121.3

(51) Int. Cl.
*G10L 15/04* (2013.01)
*G10L 15/02* (2006.01)
*G10L 15/26* (2006.01)

(52) U.S. Cl.
CPC .............. *G10L 15/04* (2013.01); *G10L 15/02* (2013.01); *G10L 15/26* (2013.01)

(58) Field of Classification Search
CPC ......... G10L 15/04; G10L 15/02; G10L 15/26; G10L 15/22; G10L 25/87
See application file for complete search history.

(56) References Cited

U.S. PATENT DOCUMENTS

| 9,437,186 B1 | 9/2016 | Hofer et al. |
| 2002/0010916 A1 | 1/2002 | Van Thong et al. |
| (Continued) | | |

FOREIGN PATENT DOCUMENTS

| CN | 103345922 A | 10/2013 |
| CN | 104142915 A | 11/2014 |
| (Continued) | | |

OTHER PUBLICATIONS

Japanese Office Action and English translation regarding JP2020-552897 dated Nov. 16, 2021.
(Continued)

*Primary Examiner* — Michelle M Koeth
*Assistant Examiner* — Darioush Agahi
(74) *Attorney, Agent, or Firm* — Crowell & Moring LLP

(57) ABSTRACT

The present disclosure describes a method, apparatus, and storage medium for performing speech recognition. The method includes acquiring, by an apparatus, first to-be-processed speech information. The apparatus includes a memory storing instructions and a processor in communication with the memory. The method includes acquiring, by the apparatus, a first pause duration according to the first to-be-processed speech information; and in response to the first pause duration being greater than or equal to a first threshold, performing, by the apparatus, speech recognition on the first to-be-processed speech information to obtain a first result of sentence segmentation of speech, the first result of sentence segmentation of speech being text information,
(Continued)

the first threshold being determined according to speech information corresponding to a previous moment.

12 Claims, 7 Drawing Sheets

(56) References Cited

U.S. PATENT DOCUMENTS

| | | | | |
|---|---|---|---|---|
| 2015/0206544 A1* | 7/2015 | Carter | ............ | G10L 15/04 |
| | | | | 704/235 |
| 2016/0379632 A1* | 12/2016 | Hoffmeister | ............ | G10L 25/87 |
| | | | | 704/253 |
| 2017/0345423 A1* | 11/2017 | Kawano | ............ | G10L 15/22 |
| 2018/0090127 A1* | 3/2018 | Hofer | ............ | G10L 15/07 |
| 2019/0080683 A1* | 3/2019 | Qian | ............ | G10L 15/1815 |

FOREIGN PATENT DOCUMENTS

| | | |
|---|---|---|
| CN | 105118499 A | 12/2015 |
| DE | 102016204315 A1 | 9/2017 |

OTHER PUBLICATIONS

International Search Report with English translation and Written Opinion regarding PCT/CN2019/098005 dated Oct. 12, 2019, 8 pages.
Chinese Office Action with English Concise Explanation of Relevance regarding 201810812121.3 dated Feb. 8, 2022.

* cited by examiner

METHOD, APPARATUS, AND STORAGE MEDIUM FOR SEGMENTING SENTENCES FOR SPEECH RECOGNITION

RELATED APPLICATION

This application is a continuation application of PCT Patent Application No. PCT/CN2019/098005, filed on Jul. 26, 2019, which claims priority to Chinese Patent Application No. 201810872121.3, filed with the China National Intellectual Property Administration on Aug. 2, 2018, both of which are incorporated herein by reference in their entireties.

FIELD OF THE TECHNOLOGY

This application relates to the field of speech processing technologies, and in particular, to a speech recognition method and a sentence-segmentation-of-speech method and apparatus.

BACKGROUND OF THE DISCLOSURE

Artificial intelligence (AI) is a new technical science that is used for simulating, extending and expanding human intelligence. AI is a branch of the computer science. AI intends to comprehend the essence of intelligence and produce a new intelligent machine that can react in a manner similar to human intelligence. Researches in the field of AI include robots, speech recognition, image recognition, natural language processing, expert systems, and the like. Among them, a very important aspect of AI is a speech recognition technology.

Current methods of sentence segmentation based on the speech recognition technology are not accurate because they do not take into account the fluctuation in speech speed when a person speaks. As a result, they suffer from the problem of frequent sentence segmentation or no sentence segmentation in a long time, and their accuracies are reduced.

SUMMARY

Embodiments of this application provide a speech recognition method and a sentence-segmentation-of-speech method and apparatus. Whether to perform sentence segmentation of speech is determined based on a duration threshold adjusted in real time according to speech information corresponding to a previous moment rather than a fixed duration threshold, thereby catering to features of speech when a person speaks. Therefore, the problem of frequent sentence segmentation or no sentence segmentation in a long time is resolved and the accuracy of sentence segmentation is improved.

In view of this, one embodiments of this application provides a speech recognition method, including:

acquiring, by a sentence-segmentation-of-speech apparatus, first to-be-processed speech information;

acquiring, by the sentence-segmentation-of-speech apparatus, a first pause duration according to the first to-be-processed speech information;

performing, by the sentence-segmentation-of-speech apparatus, speech recognition on the first to-be-processed speech information to obtain a first result of sentence segmentation of speech in a case that the first pause duration is greater than or equal to a first threshold, the first result of sentence segmentation of speech being text information;

determining, by the sentence-segmentation-of-speech apparatus, a second threshold according to the first result of sentence segmentation of speech and/or the first to-be-processed speech information;

acquiring, by the sentence-segmentation-of-speech apparatus, second to-be-processed speech information, the second to-be-processed speech information being acquired after the first to-be-processed speech information;

acquiring, by the sentence-segmentation-of-speech apparatus, a second pause duration according to the second to-be-processed speech information; and performing, by the sentence-segmentation-of-speech apparatus, speech recognition on the second to-be-processed speech information to obtain a second result of sentence segmentation of speech in a case that the second pause duration is greater than or equal to the second threshold, the second result of sentence segmentation of speech being text information.

Another embodiments of this application provides a sentence-segmentation-of-speech method, including:

acquiring, by a sentence-segmentation-of-speech apparatus, first to-be-processed speech information;

acquiring, by the sentence-segmentation-of-speech apparatus, a first pause duration according to the first to-be-processed speech information;

performing, by the sentence-segmentation-of-speech apparatus, speech recognition on the first to-be-processed speech information to obtain a first result of sentence segmentation of speech in a case that the first pause duration is greater than or equal to a first threshold, the first result of sentence segmentation of speech being text information, the first threshold being determined according to speech information corresponding to a previous moment.

Another embodiments of this application provides a sentence-segmentation-of-speech apparatus, including one or more processors and one or more memories storing program modules, the program modules being executed by the processor and including:

an acquisition module, configured to acquire first to-be-processed speech information;

the acquisition module being further configured to acquire a first pause duration according to the first to-be-processed speech information; and a sentence segmentation module, configured to perform speech recognition on the first to-be-processed speech information to obtain a first result of sentence segmentation of speech in a case that the first pause duration acquired by the acquisition module is greater than or equal to a first threshold, the first result of sentence segmentation of speech being text information, the first threshold being determined according to speech information corresponding to a previous moment.

Another embodiments of this application provides a sentence-segmentation-of-speech apparatus, including a memory, a transceiver, a processor, and a bus system;

the memory being configured to store a program;

the processor being configured to execute the program in the memory, including the following operations:

acquiring first to-be-processed speech information;

acquiring a first pause duration according to the first to-be-processed speech information;

performing, by the sentence-segmentation-of-speech apparatus, speech recognition on the first to-be-processed speech information to obtain a first result of sentence segmentation of speech in a case that the first pause duration is greater than or equal to a first threshold, the first result of sentence segmentation of speech being text information, the first threshold being determined according to speech information corresponding to a previous moment; and the bus system being configured to connect the memory and the processor, to cause the memory to communicate with the processor.

Another embodiments of this application provides a computer-readable storage medium, storing instructions, the instructions, when run on a computer, causing the computer to perform the method according to the foregoing aspects.

The present disclosure describes an embodiment for a method for performing speech recognition. The method includes acquiring, by an apparatus, first to-be-processed speech information. The apparatus includes a memory storing instructions and a processor in communication with the memory. The method includes acquiring, by the apparatus, a first pause duration according to the first to-be-processed speech information; and in response to the first pause duration being greater than or equal to a first threshold, performing, by the apparatus, speech recognition on the first to-be-processed speech information to obtain a first result of sentence segmentation of speech, the first result of sentence segmentation of speech being text information, the first threshold being determined according to speech information corresponding to a previous moment.

The present disclosure describes an embodiment for an apparatus for performing speech recognition. The apparatus includes a memory storing instructions; and a processor in communication with the memory. When the processor executes the instructions, the processor is configured to cause the apparatus to: acquire first to-be-processed speech information, acquire a first pause duration according to the first to-be-processed speech information, and in response to the first pause duration being greater than or equal to a first threshold, perform speech recognition on the first to-be-processed speech information to obtain a first result of sentence segmentation of speech, the first result of sentence segmentation of speech being text information, the first threshold being determined according to speech information corresponding to a previous moment.

The present disclosure describes an embodiment for a non-transitory computer readable storage medium storing computer readable instructions. The computer readable instructions, when executed by a processor, are configured to cause the processor to perform: acquiring first to-be-processed speech information; acquiring a first pause duration according to the first to-be-processed speech information; and in response to the first pause duration being greater than or equal to a first threshold, performing speech recognition on the first to-be-processed speech information to obtain a first result of sentence segmentation of speech, the first result of sentence segmentation of speech being text information, the first threshold being determined according to speech information corresponding to a previous moment.

It can be learned from the foregoing technical solutions that the embodiments of this application have the following advantages.

In the embodiments of this application, a sentence-segmentation-of-speech method is provided. A sentence-segmentation-of-speech apparatus at first acquires first to-be-processed speech information, and then may acquire a first pause duration according to the first to-be-processed speech information. In a case that the first pause duration is greater than or equal to a first threshold, the sentence-segmentation-of-speech apparatus performs speech recognition on the first to-be-processed speech information to obtain a first result of sentence segmentation of speech, the first result of sentence segmentation of speech being text information, the first threshold being determined according to speech information corresponding to a previous moment. Through the method, whether to perform sentence segmentation of speech is determined based on a duration threshold adjusted in real time according to speech information corresponding to a previous moment rather than a fixed duration threshold, thereby catering to features of speech when a person speaks. Therefore, the problem of frequent sentence segmentation or no sentence segmentation in a long time is resolved and the accuracy of sentence segmentation is improved.

DESCRIPTION OF EMBODIMENTS

Embodiments of this application provide a speech recognition method and a sentence-segmentation-of-speech method and apparatus. Whether to perform sentence segmentation of speech is determined based on a duration threshold adjusted in real time according to speech information corresponding to a previous moment rather than a fixed duration threshold, thereby catering to features of speech when a person speaks. Therefore, the problem of frequent sentence segmentation or no sentence segmentation in a long time is resolved and the accuracy of sentence segmentation is improved.

In the specification of the embodiments of this application, claims, and accompanying drawings, the terms "first", "second", "third", "fourth", and so on (if existing) are intended to distinguish between similar objects but do not necessarily indicate a specific order or sequence. It is to be understood that the data termed in such a way is interchangeable in proper circumstances, so that the embodiments of this application described herein for example, can be implemented in other orders than the order illustrated or described herein. Moreover, the terms "include", "comprise" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Figure 1:
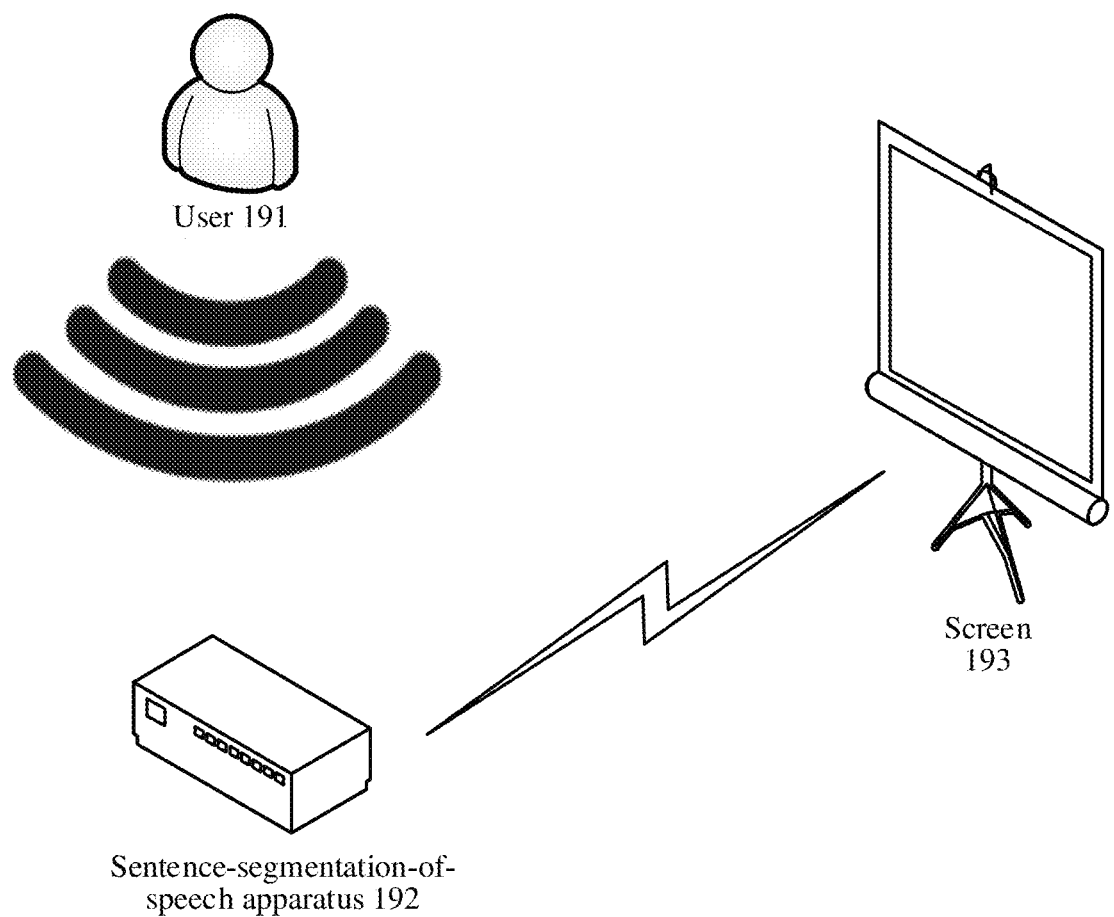
FIG. 1 is a schematic architectural diagram of a speech recognition system according to an embodiment of this application.

It is to be understood that as technologies of automatic speech recognition develop, a speech recognition rate in a relatively quiet environment has reached a level of actual application. However, in a process of releasing an actual product, there is still a series of challenges on how to maintain better user experience even in complex scenarios. For example, in a simultaneous interpretation scenario such as a speech, due to requirements for speech recognition, a translation system, and display of subtitles, a system needs to slice inputted speech or perform sentence segmentation on the inputted speech at a front end. A type of speech recognition is described below with reference to FIG. 1. Referring to FIG. 1, FIG. 1 is a schematic architectural diagram of a speech recognition system according to an embodiment of this application. As shown in the figure, using a meeting scenario as an example, a user 191 begins to speak in a meeting room. Content of what the user says is speech information. After the speech information of the user is received by a sentence-segmentation-of-speech apparatus 192 (or a sentence-segmentation apparatus) and passes through a speech front-end signal processing module (or a front-end speech processing unit), an audio stream obtained after the speech information experiences speech detection and noise reduction processing is then outputted and an inter-speech pause time that is obtained by the speech detection is outputted. The audio stream is inputted into a speech recognition module for recognition processing and pause information is compared with an adaptively changing duration threshold. When the pause time is greater than or equal to the duration threshold, sentence segmentation is triggered and sentence segmentation information is transmitted to the speech recognition module, a translation module, a subtitles displaying module, and the like. In this case, subtitles information of what the user says may be displayed on a screen 193.

Figure 2:
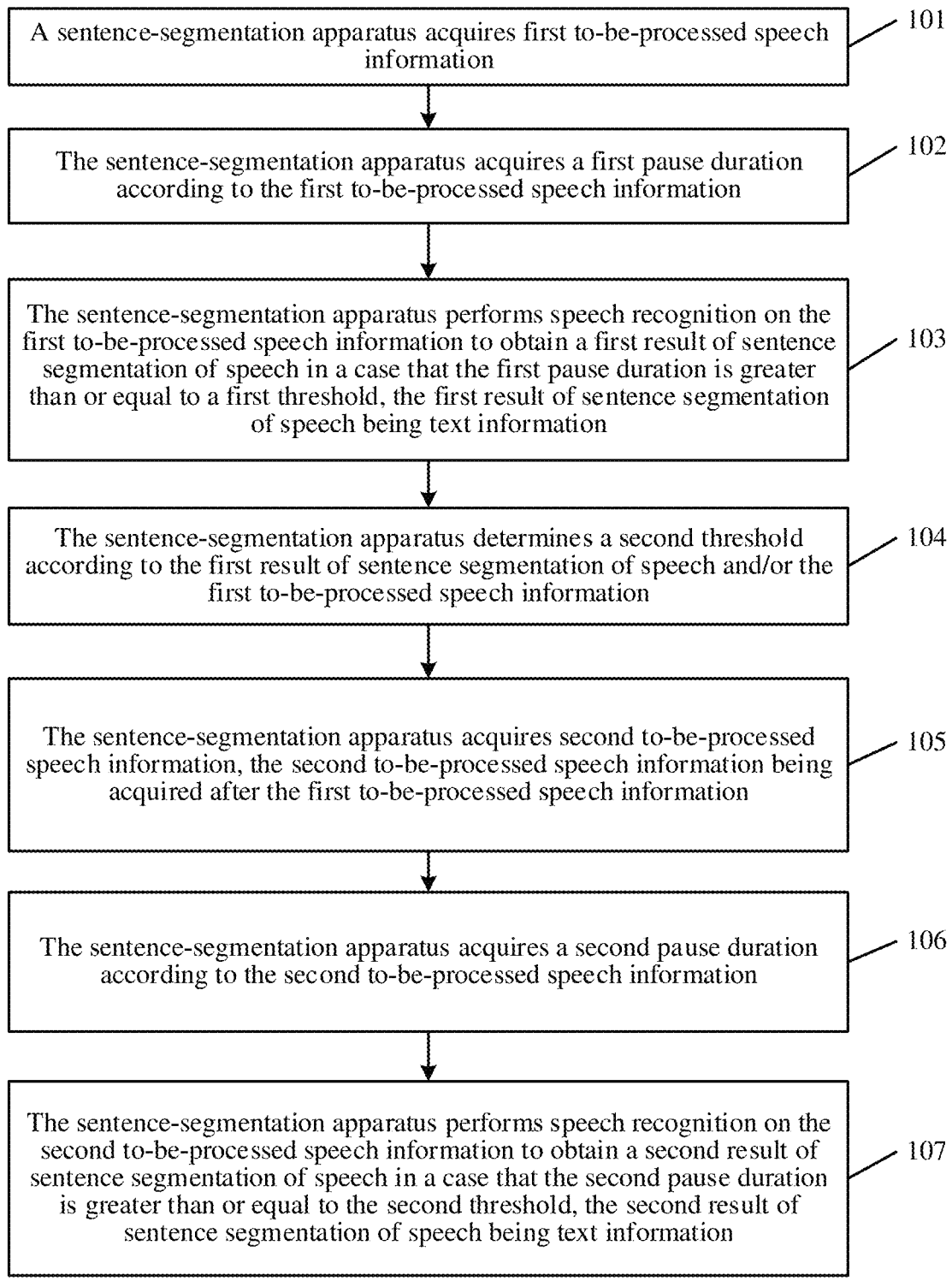
FIG. 2 is a schematic diagram of an embodiment of a speech recognition method according to an embodiment of this application.

A speech recognition method according to an embodiment of this application is described below. Referring to FIG. 2, an embodiment of the speech recognition method according to the embodiments of this application includes the following steps.

101. A sentence-segmentation apparatus acquires first to-be-processed speech information.

In this embodiment, first to-be-processed speech information is first acquired. The first to-be-processed speech information herein may usually be speech information generated when a person speaks.

102. The sentence-segmentation apparatus acquires a first pause duration according to the first to-be-processed speech information.

In this embodiment, speech processing is performed on the first to-be-processed speech information through front-end speech processing to obtain an audio data stream, that is, audio stream, and an inter-speech pause time can be detected as well, that is, a first pause duration.

103. The sentence-segmentation apparatus performs speech recognition on the first to-be-processed speech information to obtain a first result of sentence segmentation of speech in a case that the first pause duration is greater than or equal to a first threshold, the first result of sentence segmentation of speech being text information. In another implementation, the first result of sentence segmentation of speech may be audio stream.

In this embodiment, if the first pause duration is greater than or equal to a first threshold, speech recognition can be performed on the first to-be-processed speech information to obtain a first result of sentence segmentation of speech, the first result of sentence segmentation of speech herein being text information.

Optionally, the first threshold is generated according to a previous result of sentence segmentation and/or speech information, that is to say, the first threshold is adaptively and dynamically adjusted according to features (for example, sentence duration and speech speed) of a speech given by a person. Assuming that, a user A says, "Chinese music is deeply nurtured and nourished by Chinese traditional culture at present when media are continually being upgraded and updated", and after "Chinese music is deeply nurtured and nourished by Chinese traditional culture" is segmented out as a sentence, a first threshold can be calculated and assumed as 0.3 s. Here, "s" may refer to "second". A 0.35 s pause is detected after the sentence "at present when media are continually being upgraded and updated" is spoken out. Then, a next sentence comes out, that is, second to-be-processed speech information. Apparently, the first pause duration 0.35 s is greater than the first threshold 0.3 s. Therefore, a first result of sentence segmentation of speech is obtained, that is, "at present when media are continually being upgraded and updated", and may be displayed on a screen in the form of subtitles.

104. The sentence-segmentation apparatus determines a second threshold according to the first result of sentence segmentation of speech and/or the first to-be-processed speech information.

In this embodiment, a second threshold is calculated according to word number information of the first result of sentence segmentation of speech, or a second threshold is calculated according to duration information of the first to-be-processed speech information, or a second threshold is calculated according to word number information of the first result of sentence segmentation of speech and duration information of the first to-be-processed speech information.

105. The sentence-segmentation apparatus acquires second to-be-processed speech information, the second to-be-processed speech information being acquired after the first to-be-processed speech information.

In this embodiment, after the first to-be-processed speech information is acquired, second to-be-processed speech information may be then acquired. If the user A, after uttering "at present when media are continually being upgraded and updated" in the meeting, continues to say, "Rocket Girls 101 will show unique charm of Chinese girls in a youthful and positive attitude", "Rocket Girls 101 will show unique charm of Chinese girls in a youthful and positive attitude" is the second to-be-processed speech information.

106. The sentence-segmentation apparatus acquires a second pause duration according to the second to-be-processed speech information.

In this embodiment, speech processing is performed on the second to-be-processed speech information through the front-end speech processing to obtain an audio data stream, that is, audio stream, and an inter-speech pause time can be detected as well, that is, a second pause duration.

107. The sentence-segmentation apparatus performs speech recognition on the second to-be-processed speech information to obtain a second result of sentence segmentation of speech in a case that the second pause duration is greater than or equal to the second threshold, the second result of sentence segmentation of speech being text information. In another implementation, the second result of sentence segmentation may be an audio stream.

In this embodiment, if the second pause duration is greater than or equal to the second threshold, speech recognition can be performed on the second to-be-processed speech information to obtain a second result of sentence segmentation of speech, the second result of sentence segmentation of speech herein being text information.

Optionally, the second threshold is obtained through calculation according to the method described in step 104. Assuming that the user A continues to say "Rocket Girls 101 will show unique charm of Chinese girls in a youthful and positive attitude" in the meeting, a second threshold can be calculated and assumed as 0.3 s after "at present when media are continually being upgraded and updated" is segmented out as a sentence. A 0.32 s pause is detected after the sentence "Rocket Girls 101 will show unique charm of Chinese girls in a youthful and positive attitude" is spoken out, and then a next sentence comes out. Apparently, the second pause duration 0.32 s is greater than the second threshold 0.3 s. Therefore, a second result of sentence segmentation of speech is obtained, that is, "Rocket Girls 101 will show unique charm of Chinese girls in a youthful and positive attitude", and may be displayed on a screen in the form of subtitles.

Figure 3:
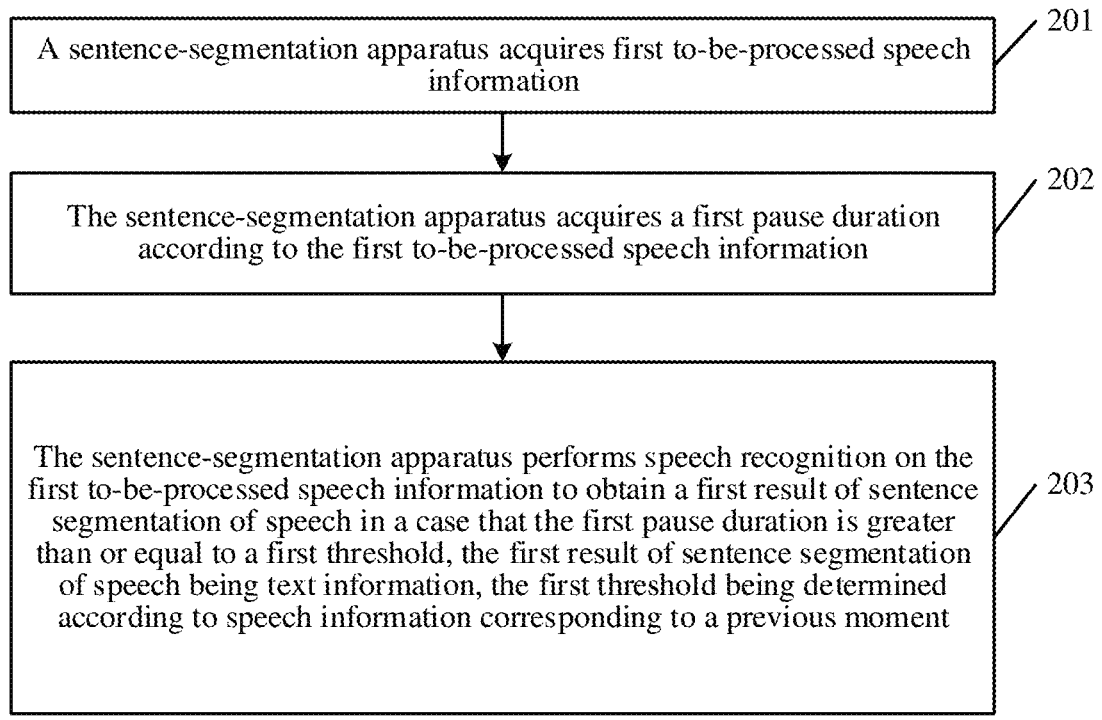
FIG. 3 is a schematic diagram of an embodiment of a sentence-segmentation-of-speech method according to an embodiment of this application.

A sentence-segmentation method according to an embodiment of this application is described below from a perspective of a sentence-segmentation apparatus. Referring to FIG. 3, an embodiment of the sentence-segmentation method according to the embodiments of this application includes the following steps.

201. A sentence-segmentation apparatus acquires first to-be-processed speech information.

In this embodiment, a sentence-segmentation apparatus at first acquires first to-be-processed speech information. The first to-be-processed speech information herein may usually be speech information generated when a person speaks.

It may be understood that, the sentence-segmentation apparatus may be deployed on a terminal device, for example, a mobile phone, a tablet computer, a personal computer, a palmtop computer, and the like. The terminal device includes an input apparatus, such as a microphone. The microphone records content of what a user says.

202. The sentence-segmentation apparatus acquires a first pause duration according to the first to-be-processed speech information.

In this embodiment, the sentence-segmentation apparatus performs speech processing on the first to-be-processed speech information through front-end speech processing to obtain an audio data stream, that is, audio stream, and an inter-speech pause time can be detected as well, that is, a first pause duration.

With quick development of technologies of deep learning, speech recognition in a quiet environment has basically met requirements of actual application. However, confronted with interferences of noise, reverberation and echo in a real environment and more casual verbal expression, the performance of the speech recognition is significantly reduced. In particular, it is still difficult for the speech recognition in a far-talking environment to meet requirements of actual application.

The technology of front-end speech processing plays a very important role in improving the robustness of speech recognition. A front-end processing module suppresses various interferences to keep to-be-recognized speech cleaner. The front-end speech processing module plays an important role in particular to a speech recognition system oriented to a smart household or to an intelligent vehicle. Apart from the speech recognition, a front-end speech processing algorithm has also been widely applied to speech communication and speech repair. A front-end speech processing algorithm oriented to speech recognition improves the robustness of the speech recognition through echo cancellation, noise suppression, and dereverberation. In one implementation, dereverberation may include removing the effects of reverberation from sound after such reverberant sound has been picked up by a sound recording device/sensor (e.g., a microphone). There are various interference sources such as background noise, human voice, reverberation, and echo in a real environment. Such factors are combined together to render the front-end speech processing more challenging.

203. The sentence-segmentation apparatus performs speech recognition on the first to-be-processed speech information to obtain a first result of sentence segmentation of speech in a case that the first pause duration is greater than or equal to a first threshold, the first result of sentence segmentation of speech being text information, the first threshold being determined according to speech information corresponding to a previous moment.

In this embodiment, if the first pause duration is greater than or equal to a first threshold, the sentence-segmentation apparatus may perform speech recognition on the first to-be-processed speech information to obtain a first result of sentence segmentation of speech, the first result of sentence segmentation of speech herein being text information.

Optionally, the first threshold is generated according to speech information (for example, a result of sentence segmentation and/or to-be-processed speech information) at a previous moment, that is to say, the first threshold is adaptively and dynamically adjusted according to features (for example, sentence duration and speech speed) of a speech given by a person. Assuming that, a user A says, "Chinese music is deeply nurtured and nourished by Chinese traditional culture at present when media are continually being upgraded and updated", and after "Chinese music is deeply nurtured and nourished by Chinese traditional culture" is segmented out as a sentence, a first threshold can be calculated and assumed as 0.3 s. A 0.35 s pause is detected after the sentence "at present when media are continually being upgraded and updated" is spoken out. Then, a next sentence comes out, that is, second to-be-processed speech information. Apparently, the first pause duration 0.35 s is greater than the first threshold 0.3 s. Therefore, a first result of sentence segmentation of speech is obtained, that is, "at present when media are continually being upgraded and updated", and may be displayed on a screen in the form of subtitles.

In the embodiments of this application, a sentence-segmentation method is provided. A sentence-segmentation apparatus at first acquires first to-be-processed speech information, and then may acquire a first pause duration according to the first to-be-processed speech information. In a case that the first pause duration is greater than or equal to a first threshold, the sentence-segmentation apparatus performs speech recognition on the first to-be-processed speech information to obtain a first result of sentence segmentation of speech, the first result of sentence segmentation of speech being text information, the first threshold being determined according to speech information corresponding to a previous moment. Through the method, whether to perform sentence segmentation of speech is determined based on a duration threshold adjusted in real time according to speech information corresponding to a previous moment rather than a fixed duration threshold, thereby catering to features of speech when a person speaks. Therefore, the problem of frequent sentence segmentation or no sentence segmentation in a long time is resolved and the accuracy of sentence segmentation is improved.

Optionally, based on the embodiment corresponding to FIG. 3, in a first optional embodiment of the sentence-segmentation method according to the embodiments of this application, after the performing speech recognition on the first to-be-processed speech information to obtain a first result of sentence segmentation of speech, the method may further include:

determining, by the sentence-segmentation apparatus, a second threshold;

acquiring, by the sentence-segmentation apparatus, second to-be-processed speech information;

acquiring, by the sentence-segmentation apparatus, a second pause duration according to the second to-be-processed speech information; and performing, by the sentence-segmentation apparatus, speech recognition on the second to-be-processed speech information to obtain a second result of sentence segmentation of speech in a case that the second pause duration is greater than or equal to the second threshold, the second result of sentence segmentation of speech being text information.

In this embodiment, the sentence-segmentation apparatus may calculate a second threshold according to word number information of the first result of sentence segmentation of speech, or calculate a second threshold according to duration information of the first to-be-processed speech information, or calculate a second threshold according to word number information of the first result of sentence segmentation of speech and duration information of the first to-be-processed speech information. Then, after the first to-be-processed speech information is acquired, second to-be-processed speech information is then acquired. If the user A, after uttering "at present when media are continually being upgraded and updated" in the meeting, continues to say, "Rocket Girls 101 will show unique charm of Chinese girls in a youthful and positive attitude", "Rocket Girls 101 will show unique charm of Chinese girls in a youthful and positive attitude" is the second to-be-processed speech information.

The sentence-segmentation apparatus performs speech processing on the second to-be-processed speech information through front-end speech processing to obtain an audio data stream, that is, audio stream, and an inter-speech pause time can be detected as well, that is, a second pause duration. If the second pause duration is greater than or equal to the second threshold, speech recognition may be performed on the second to-be-processed speech information to obtain a second result of sentence segmentation of speech, the second result of sentence segmentation of speech herein being text information.

Optionally, the second threshold is obtained through calculation according to the method described in step 104. Assuming that the user A continues to say "Rocket Girls 101 will show unique charm of Chinese girls in a youthful and positive attitude" in the meeting, a second threshold can be calculated and assumed as 0.3 s after "at present when media are continually being upgraded and updated" is segmented out as a sentence. A 0.32 s pause is detected after the sentence "Rocket Girls 101 will show unique charm of Chinese girls in a youthful and positive attitude" is spoken out, and then a next sentence comes out. Apparently, the second pause duration 0.32 s is greater than the second threshold 0.3 s. Therefore, a second result of sentence segmentation of speech is obtained, that is, "Rocket Girls 101 will show unique charm of Chinese girls in a youthful and positive attitude", and may be displayed on a screen in the form of subtitles.

In addition, in this embodiment of this application, the sentence-segmentation apparatus determines a second threshold, then acquires second to-be-processed speech information, and acquires a second pause duration according to the second to-be-processed speech information. If the second pause duration is greater than or equal to the second threshold, the sentence-segmentation apparatus performs speech recognition on the second to-be-processed speech information to obtain a second result of sentence segmentation of speech, the second result of sentence segmentation of speech being text information. Through the method, a duration threshold can be flexibly adjusted and a new duration threshold is generated according to previous speech information to determine whether to perform sentence segmentation of speech, thereby catering to features of speech when a person speaks. Therefore, the problem of frequent sentence segmentation or no sentence segmentation in a long time is resolved and the accuracy of sentence segmentation is improved.

Optionally, based on the first embodiment corresponding to FIG. 3, in a second optional embodiment of the sentence-segmentation method according to the embodiments of this application, the determining a second threshold may include:

determining, by the sentence-segmentation apparatus, the second threshold according to a target speech duration;

or determining, by the sentence-segmentation apparatus, the second threshold according to a speech speed at a first moment and a speech speed at a second moment;

or determining, by the sentence-segmentation apparatus, the second threshold according to a target speech duration, a speech speed at a first moment, and a speech speed at a second moment.

In this embodiment, when the sentence-segmentation apparatus determines whether the pause time is greater than the duration threshold, the duration threshold is a value obtained through adaptive threshold calculation rather than a preset fixed threshold. For example, a next duration threshold can be determined according to current to-be-processed speech information. The to-be-processed speech information carries features of a speech given by a person, that is, a duration of uttering a complete sentence. The duration threshold can be obtained through calculation according to the sentence duration. In another example, the next duration threshold can be determined according to a result of current sentence segmentation. The result of sentence segmentation carries content of the speech of the person, mainly including the word number of the speech. The speed of the speech can be determined according to the word number said in a unit time, so that the duration threshold is obtained through calculation.

Certainly, based on the two manners above, the duration threshold may be further obtained through calculation according to both the duration of uttering a complete sentence and the speed of the speech. It may be understood that the determining a next duration threshold according to both current to-be-processed speech information and a result of current sentence segmentation of speech can be better applied to different scenarios, thereby improving the credibility of duration threshold calculation.

Furthermore, in this embodiment of this application, the sentence-segmentation apparatus calculates the second threshold according to word number information of the first result of sentence segmentation of speech, or calculates the second threshold according to duration information of the first to-be-processed speech information, or calculates the second threshold according to word number information of the first result of sentence segmentation of speech and duration information of the first to-be-processed speech information. Through the method above, a speech speed can be learned by using word number information and an accumulated sentence duration can be learned by using duration information. The speech speed, the accumulated sentence duration, and a combination thereof can each be used as a basis on which a duration threshold is generated, thereby improving the credibility of duration threshold calculation.

Optionally, based on the second embodiment corresponding to FIG. 3, in a third optional embodiment of the sentence-segmentation method according to the embodiments of this application, the determining the second threshold according to a target speech duration may include:

calculating, by the sentence-segmentation apparatus, the target speech duration according to a speech start moment and a speech end moment of the first to-be-processed speech information; and obtaining, by the sentence-segmentation apparatus through calculation, the second threshold according to the target speech duration, a preset speech duration range, a first preset speech duration, and a maximum speech duration.

In this embodiment, how to determine the second threshold by using the first to-be-processed speech information is to be described, that is, how to acquire a next duration threshold that needs to be used for comparison by using currently obtained to-be-processed speech information.

Figure 4:
FIG. 4 is a schematic diagram of an embodiment of to-be-processed speech information according to an embodiment of this application.

Optionally, the sentence-segmentation apparatus at first acquires a speech start moment and a speech end moment of the first to-be-processed speech information. The first to-be-processed speech information herein can be understood as a complete sentence. For example, the first to-be-processed speech information is a sentence "Chinese music is deeply nurtured and nourished by Chinese traditional culture (whose pinyin is hua yu yue tan shen shou zhong guo chuan tong wen hua de jin run yu zi yang)". For ease of understanding, referring to FIG. 4, FIG. 4 is a schematic diagram of an embodiment of to-be-processed speech information according to an embodiment of this application. As shown in the figure, the moment when the first speech sound "hua" starts is the speech start moment 481 and the moment when the speech sound "yang" just ends is the speech end moment 482. However, in an actual situation, there may be a pause time after a sentence is spoken out. The period of time is from the speech end moment to an end moment of sentence segmentation 483.

The sentence-segmentation apparatus then obtains the target speech duration through calculation according to the speech start moment and the speech end moment, and at last obtains the second threshold through calculation according to the target speech duration, a preset speech duration range, a first preset speech duration, and a maximum speech duration. The preset speech duration range includes an upper limit value and a lower limit value, and both the preset speech duration range and the first preset speech duration are set in advance. Specific values are not limited herein.

Figure 5:
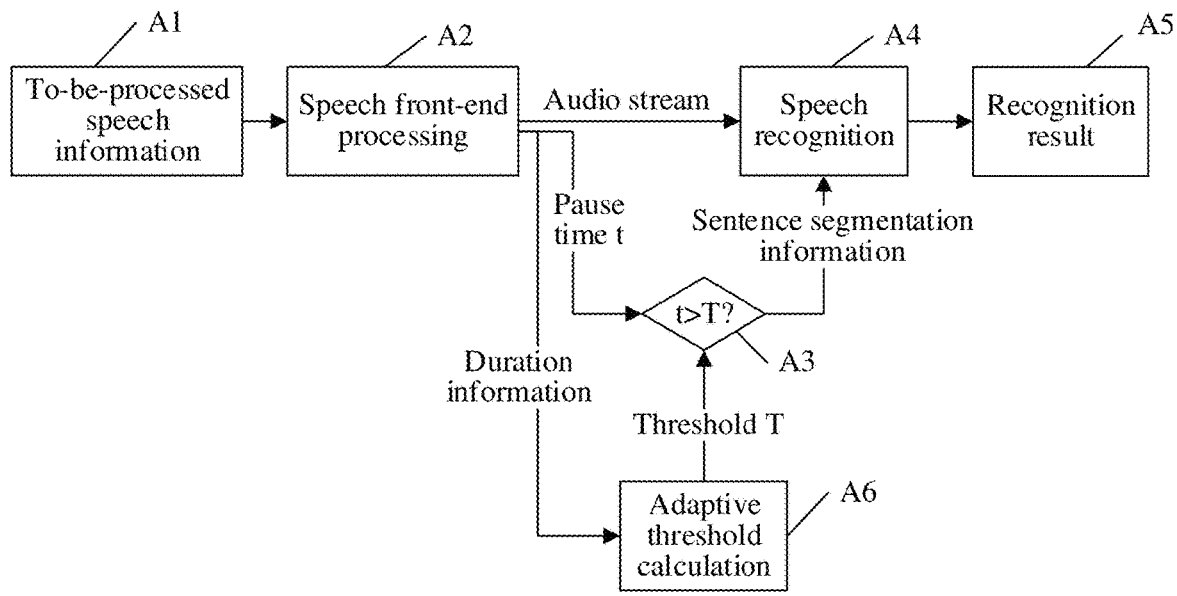
FIG. 5 is a schematic flowchart of adaptive sentence segmentation based on a sentence duration according to an embodiment of this application.

For ease of understanding, referring to FIG. 5, FIG. 5 is a schematic flowchart of adaptive sentence segmentation based on a sentence duration according to an embodiment of this application. As shown in the figure, a specific process is described below.

In step A1, the sentence-segmentation apparatus at first acquires to-be-processed speech information.

In step A2, the to-be-processed speech information is then transmitted to a speech front end for processing to output an audio stream of the to-be-processed speech information, a corresponding pause time t, and duration information of this sentence. Content of the processing includes, but is not limited to, reduction of interferences of noise, reverberation, and echo.

In step A3, whether the pause time t is greater than a duration threshold T is determined. The duration threshold T herein is a value obtained after being adjusted according to features of a speech given by a person rather than a value fixed in advance. If the pause time t is greater than the duration threshold T, step A4 is performed, that is, sentence segmentation processing is performed. In another implementation, step A3 may include determining whether the pause time t is greater than or equal to a duration threshold T. When the pause time t is greater than or equal to the duration threshold T, step A4 is performed, that is, sentence segmentation processing is performed.

In step A4, the audio stream is inputted into a speech recognition module and then is recognized as specific subtitles.

In step A5, a recognition result may be expressed as subtitles.

In step A6, a next duration threshold can be adaptively calculated by using the duration information of this sentence. The reason is that, from a perspective of statistics, the duration of each normal sentence has a particular range. Therefore, when the accumulated duration is less than the range, sentence segmentation tends to be performed difficultly. When the accumulated duration is greater than the range, sentence segmentation tends to be performed more easily.

Optionally, in this embodiment of this application, the first manner of calculating a duration threshold by the sentence-segmentation apparatus is described. A target speech duration may be calculated according to a speech start moment and a speech end moment of the first to-be-processed speech information, and then the second threshold is obtained through calculation according to the target speech duration, a preset speech duration range, a first preset speech duration, and a maximum speech duration. Through the manner above, information about a sentence duration in to-be-processed speech information can be effectively used. A duration threshold obtained through calculation thereby has a better reference value and credibility.

Optionally, based on the third embodiment corresponding to FIG. 3, in a fourth optional embodiment of the sentence-segmentation method according to the embodiments of this application, the calculating the target speech duration according to a speech start moment and a speech end moment of the first to-be-processed speech information may include:

calculating, by the sentence-segmentation apparatus, the target speech duration by using the following manner:

$$d = c_t - s_t;$$

where d represents the target speech duration, $c_t$ represents the speech end moment, and $s_t$ represents the speech start moment; and the obtaining the second threshold through calculation according to the target speech duration, a preset speech duration range, a first preset speech duration, and a maximum speech duration may include:

calculating, by the sentence-segmentation apparatus, the second threshold by using the following manner:

$$T = f_0(d) = \begin{cases} T_0 \times \left(1 + \dfrac{D_{low} - d}{D_{low}}\right), & d \leq D_{low} \\ T_0, & D_{low} < d < D_{high} \\ T_0 \times \max\left(\dfrac{D_{max} - d}{D_{max} - D_{high}}, 0\right), & d \geq D_{high} \end{cases} ;$$

where T represents the second threshold, $f_0(d)$ represents a first threshold calculation function, $T_0$ represents the first preset speech duration, $D_{low}$ represents a minimum value in the preset speech duration range, $D_{high}$ represents a maximum value in the preset speech duration range, and $D_{max}$ represents the maximum speech duration.

In this embodiment, a speech duration indicates a duration from the speech start moment $s_t$ to the speech end moment $c_t$ of speech of this sentence after the previous sentence segmentation of speech. Therefore, the speech duration may be equal to $d=c_t-s_t$. If the speech start moment $s_t$ is 12:15:32 and the speech end moment $c_t$ is 12:15:41, the target speech duration d is 9 s.

From a perspective of statistics, the duration of a normal sentence has a particular range. Therefore, when a pause duration is less than the range, an algorithm tends to perform sentence segmentation difficultly, and when the pause duration is greater than the range, the algorithm tends to perform sentence segmentation easily. That is, as the accumulated sentence duration increases, the difficulty in triggering sentence segmentation decreases. Therefore, the second threshold T may be expressed as:

$T=f_0(d)$;

where $f_0$ may be any monotonically non-increasing function, that is, expressed as:

$$T = f_0(d) = \begin{cases} T_0 \times \left(1 + \dfrac{D_{low} - d}{D_{low}}\right), & d \leq D_{low} \\ T_0, & D_{low} < d < D_{high} \\ T_0 \times \max\left(\dfrac{D_{max} - d}{D_{max} - D_{high}}, 0\right), & d \geq D_{high} \end{cases} ;$$

where $T_0$ represents the first preset speech duration, $D_{low}$ represents a minimum value in the preset speech duration range, $D_{high}$ represents a maximum value in the preset speech duration range, and $D_{max}$ represents the maximum speech duration. That is, in a case of being greater than $D_{max}$, sentence segmentation is performed forcibly.

A feasible setting is that $T_0$ may be 0.5, $D_{low}$ may be 2 s, $D_{high}$ may be 8 s, and $D_{max}$ may be 20 s. Therefore, the second threshold T may be expressed as:

$$T = f_0(d) = \begin{cases} 0.5 \times \left(1 + \dfrac{2 - d}{2}\right), & d \leq 2 \\ 0.5, & 2 < 8 \\ 0.5 \times \max\left(\dfrac{20 - d}{20 - 8}, 0\right), & d \geq 8 \end{cases} .$$

Assuming that d is 1 s, it may be learned, according to the first formula, that the second threshold T is equal to 0.75 s. Assuming that d is 5 s, it may be learned, according to the second formula, that the second threshold T is equal to 0.5 s. Assuming that d is 12 s, it may be learned, according to the third formula, that the second threshold T is equal to 0.33 s.

Optionally, in this embodiment of this application, the specific manner of calculating the second threshold is described. Considering that each normal sentence has a particular duration range, a pause duration for which a speaker pauses after speaking is used as a basis to determine whether to perform sentence segmentation. When the pause duration is less than a threshold (e.g., a dynamically determined threshold), an algorithm tends to perform sentence segmentation difficultly, and when the pause duration is greater than or equal to the threshold, the algorithm tends to perform sentence segmentation easily. The method above fully takes advantage of features of a sentence duration. A threshold (e.g., a duration threshold) is generated closer to a speech style of a speaker and the proper length of a sentence, thereby improving the credibility of duration threshold calculation.

Optionally, based on the second embodiment corresponding to FIG. 3, in a fifth optional embodiment of the sentence-segmentation method according to the embodiments of this application, the determining the second threshold according to a speech speed at a first moment and a speech speed at a second moment may include:

acquiring, by the sentence-segmentation apparatus, a text word number and a target unit time;

calculating, by the sentence-segmentation apparatus, the speech speed at the second moment according to the speech speed at the first moment, the text word number, the target unit time, and a smoothing factor, the first moment being a moment before the second moment; and obtaining, by the sentence-segmentation apparatus through calculation, the second threshold according to the speech speed at the second moment, a preset speech speed range, and a second preset speech duration.

In this embodiment, how to determine the second threshold by using the first result of sentence segmentation of speech is to be described, that is, how to acquire a next duration threshold that needs to be used for comparison by using text information obtained through current sentence segmentation.

Optionally, at first, a corresponding text word number and time of uttering the text may be acquired according to the text information (for example, according to the first result of sentence segmentation of speech or time used of uttering this sentence and a total word number of this sentence). Next, a speech speed at a previous time point may be obtained through calculation according to the text word number and the target unit time. Assuming that the speech speed is updated once every second, a difference between the second moment and the first moment is 1 s. The speech speed at the second moment is calculated by using the speech speed at the first moment, the text word number, the target unit time, and a smoothing factor. At last, the second threshold is obtained through calculation according to the speech speed at the second moment, a preset speech speed range, and a second preset speech duration.

Figure 6:
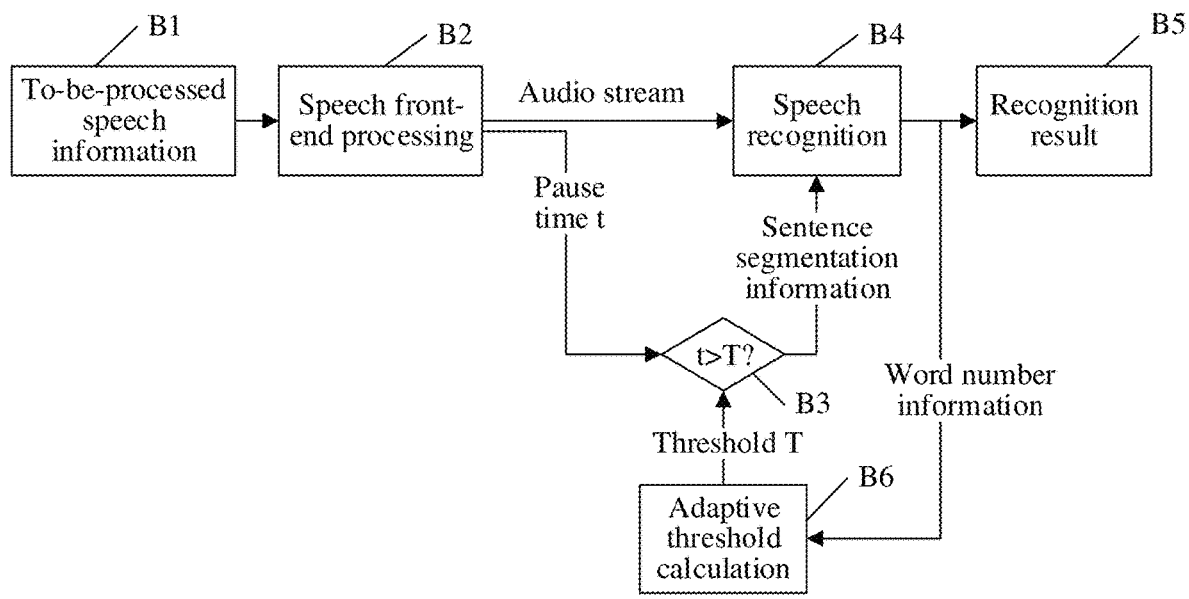
FIG. 6 is a schematic flowchart of adaptive sentence segmentation based on a speech speed according to an embodiment of this application.

For ease of understanding, referring to FIG. 6, FIG. 6 is a schematic flowchart of adaptive sentence segmentation based on a speech speed according to an embodiment of this application. As shown in the figure, an optional process is described below.

In step B1, the sentence-segmentation apparatus at first acquires to-be-processed speech information.

In step B2, the to-be-processed speech information is then transmitted to a speech front end for processing to output an audio stream of the to-be-processed speech information, a corresponding pause time t, and duration information of this sentence. Content of the processing includes, but is not limited to, reduction of interferences of noise, reverberation, and echo.

In step B3, whether the pause time t is greater than a duration threshold T is determined. The duration threshold T herein is a value obtained after being adjusted according to features of a speech given by a person rather than a value fixed in advance. If the pause time t is greater than the duration threshold T, step B4 is performed, that is, sentence segmentation processing is performed. In another implementation, step B3 may include determining whether the pause time t is greater than or equal to a duration threshold T. When the pause time t is greater than or equal to the duration threshold T, step B4 is performed, that is, sentence segmentation processing is performed.

In step B4, the audio stream is inputted into a speech recognition module and then is recognized as specific subtitles.

In step B5, a recognition result may be expressed as subtitles.

In step B6, a next duration threshold can be adaptively calculated by using the speech speed of this sentence. The reason is that from a perspective of statistics, a higher speech speed indicates a shorter pause between sentences, and on the contrary, a lower speech speed indicates a longer pause between sentences. Therefore, the speech speed and the duration threshold are in a negative correlation.

Optionally, in this embodiment of this application, the first manner of calculating a duration threshold by the sentence-segmentation apparatus is described. A text word number and a target unit time may be acquired. The speech speed at the second moment is then calculated according to the speech speed at the first moment, the text word number, the target unit time, and a smoothing factor, the first moment being a moment before the second moment. At last, the second threshold is obtained through calculation according to the speech speed at the second moment, a preset speech speed range, and a second preset speech duration. Through the method above, a speech speed in a result of sentence segmentation of speech can be effectively considered. According to the speech speed, a duration threshold is updated continually, bestowing the duration threshold with a better reference value and creditability.

Optionally, based on the fifth embodiment corresponding to FIG. 3, in a sixth optional embodiment of the sentence-segmentation method according to the embodiments of this application, the calculating the speech speed at the second moment according to the speech speed at the first moment, the text word number, the target unit time, and a smoothing factor may include:

calculating, by the sentence-segmentation apparatus, the speech speed at the second moment by using the following manner:

$$s_i = \alpha \times s_{i-1} + (1-\alpha) \times \frac{n}{\Delta t};$$

where $s_i$ represents the speech speed at the second moment, $s_{i-1}$ represents the speech speed at the first moment, $n$ represents the text word number, $\Delta t$ represents the target unit time, and $\alpha$ represents the smoothing factor; and the obtaining, by the sentence-segmentation apparatus through calculation, the second threshold according to the speech speed at the second moment, a preset speech speed range, and a second preset speech duration includes:

calculating, by the sentence-segmentation apparatus, the second threshold by using the following manner:

$$T = f_1(s) = T_1 \times \left(\max\left(\min\left(\frac{S_{high} - S_i}{S_{high} - S_{low}}, 1\right), 0\right) + 0.5\right);$$

where T represents the second threshold, $f_1(s)$ represents a second threshold calculation function, $T_1$ represents the second preset speech duration, $S_{high}$ represents a maximum value in the preset speech speed range, $S_{low}$ represents a minimum value in the preset speech speed range, and $S_i$ represents the speech speed at the second moment.

In this embodiment, the sentence-segmentation apparatus at first acquires a text word number and a target unit time (a feasible situation is that the text word number may be a word number corresponding to the first result of sentence segmentation of speech and the target unit time may be time of uttering this sentence). Assuming that the text is "today is a day that is worthy of being memorized", it takes 2 s to utter the sentence, and a total of 10 words are spoken out, the text word number is 10 and the target unit time is 2 s.

In an actual system, there is a delay in recognizing returned word number information and the speech speed of a speaker changes constantly. Therefore, to ensure the stability of an algorithm, relatively smooth speech speed information is required in actual use, that is, a smoothing factor $\alpha$ needs to be introduced. Values in the value range of $\alpha$ may be greater than 0 and less than 1. From a perspective of statistics, a higher speech speed indicates a shorter pause between sentences; and a lower speech speed indicates a longer pause between sentences. Therefore, the speech speed and the threshold of sentence segmentation are in a negative correlation. That is, the second threshold T may be expressed as:

$$T = f_1(d);$$

where $f_1$ may be any monotonically non-increasing function, that is, expressed as:

$$T = f_1(s) = T_1 \times \left(\max\left(\min\left(\frac{S_{high} - S_i}{S_{high} - S_{low}}, 1\right), 0\right) + 0.5\right);$$

where T represents the second threshold, $f_1(s)$ represents the second threshold calculation function, $T_1$ represents the second preset speech duration, that is, a duration threshold at a normal speech speed, $S_{high}$ represents the maximum value in the preset speech speed range, $S_{low}$ represents the minimum value in the preset speech speed range, and $S_i$ represents the speech speed at the second moment.

A feasible setting is that $T_1$ may be 0.5, $S_{high}$ may be 5 words per second, $S_{low}$ represents 2 words per second, and $S_i$ may be calculated by using the following formula:

$$s_i = \alpha \times s_{i-1} + (1-\alpha) \times \frac{n}{\Delta t};$$

where $s_i$ represents the speech speed at the second moment, $s_{i-1}$ represents the speech speed at the first moment, n represents the text word number, Δt represents the target unit time, and α represents the smoothing factor.

A feasible setting is that $s_{i-1}$ may be 3 words per second, n may be 10 words, Δt may be 2 s, and α may be 0.9. Therefore, the value of $S_i$ is calculated as 3.2 words per second which is then substituted into a formula of calculating $f_1(d)$. The result is obtained as follows:

$$T = f_1(s) = 0.5 \times \left(\max\left(\min\left(\frac{5-3.2}{5-2}, 1\right), 0\right) + 0.5\right)$$
$$= 0.5 \times (\max(\min(0.6, 1), 0) + 0.5)$$
$$= 0.5 \times (0.6 + 0.5)$$
$$= 0.55$$

That is, the second threshold may be 0.55 s.

Optionally, in this embodiment of this application, the specific manner of calculating the second threshold is described. Considering that a different person speaks at a different speech speed, a speech speed of a speaker is used as a basis to determine whether to perform sentence segmentation. A higher speech speed indicates a shorter pause between sentences, and a lower speech speed indicates a longer pause between sentences. Therefore, the speech speed and the threshold of sentence segmentation are in a negative correlation. The method above fully takes advantage of features of a speech speed. A duration threshold is generated closer to a speech style of a speaker and the speech speed of the speaker, thereby improving the credibility of duration threshold calculation. In addition, a slower update of a speech speed causes a delay of a client, an unsteady word number feedback, and a quick speech change in a unit time when a calculation is performed. Therefore, introducing the smoothing factor can ensure a more steady result of an algorithm, and further improve the practicability of the solution.

Optionally, based on the second embodiment corresponding to FIG. 3, in a seventh optional embodiment of the sentence-segmentation method according to the embodiments of this application, the determining the second threshold according to a target speech duration, a speech speed at a first moment, and a speech speed at a second moment may include:

calculating, by the sentence-segmentation apparatus, the target speech duration according to a speech start moment and a speech end moment of the first to-be-processed speech information; and acquiring, by the sentence-segmentation apparatus, a text word number and a target unit time;

calculating, by the sentence-segmentation apparatus, the speech speed at the second moment according to the speech speed at the first moment, the text word number, the target unit time, and a smoothing factor, the first moment being a moment before the second moment; and obtaining, by the sentence-segmentation apparatus through calculation, the second threshold according to the target speech duration, a preset speech duration range, a preset speech speed range, a third preset speech duration, and a maximum speech duration.

In this embodiment, how to determine the second threshold by using the first to-be-processed speech information and the first result of sentence segmentation of speech is to be described, that is, how to acquire a next duration threshold that needs to be used for comparison by using text information obtained through current sentence segmentation and currently obtained to-be-processed speech information.

Optionally, the sentence-segmentation apparatus at first acquires a speech start moment and a speech end moment of the first to-be-processed speech information. The first to-be-processed speech information herein can be understood as a complete sentence. For example, the first to-be-processed speech information is a sentence "Chinese music is deeply nurtured and nourished by Chinese traditional culture (whose pinyin is hua yu yue tan shen shou zhong guo chuan tong wen hua de jin run yu zi yang)". For ease of understanding, referring to FIG. 4, the moment when the first speech sound "hua" starts is the speech start moment and the moment when the speech sound "yang" just ends is the speech end moment. However, in an actual situation, there may be a pause time after a sentence is spoken out. The period of time is from the speech end moment to an end moment of sentence segmentation. The sentence-segmentation apparatus obtains the target speech duration through calculation according to the speech start moment and the speech end moment. The sentence-segmentation apparatus may acquire a text word number corresponding to the text information and a target unit time of uttering this sentence. Next, a speech speed at a previous time point may be obtained through calculation according to the text word number and the target unit time. Assuming that the speech speed is updated once every second, a difference between the second moment and the first moment is 1 s. The speech speed at the second moment is then calculated by using the speech speed at the first moment, the text word number, the target unit time, and a smoothing factor. At last, the second threshold is obtained through calculation according to the target speech duration, a preset speech duration range, a preset speech speed range, a third preset speech duration, and a maximum speech duration. The preset speech duration range includes an upper limit value and a lower limit value, and both the preset speech duration range and the first preset speech duration are set in advance. Specific values are not limited herein. The preset speech speed range also includes an upper limit value and a lower limit value, and both the preset speech speed range and the second preset speech duration are set in advance. Specific values are not limited herein.

Figure 7:
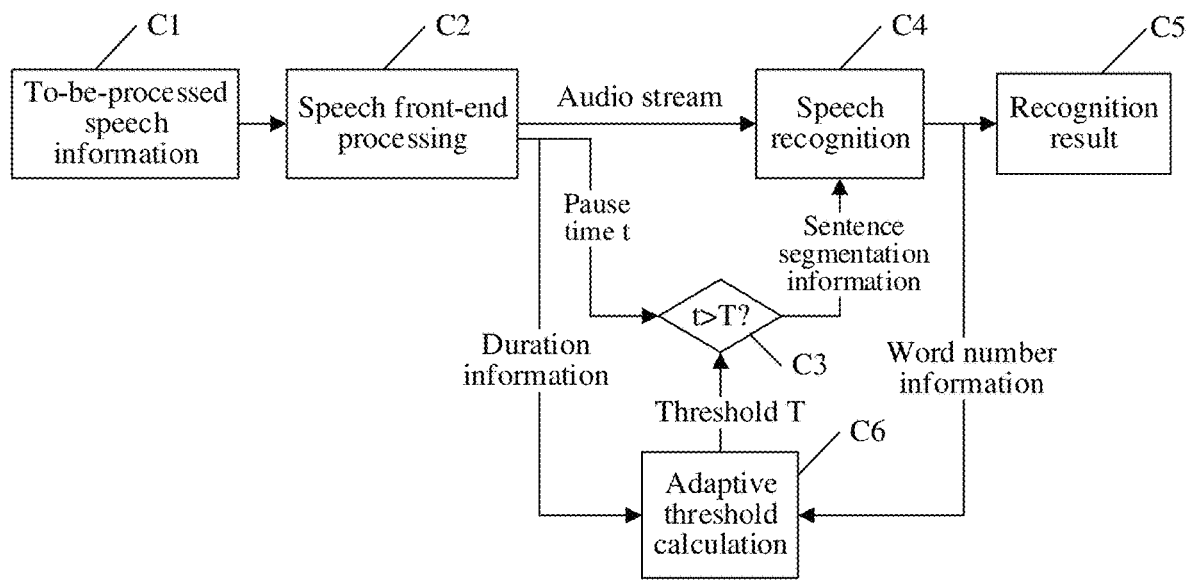
FIG. 7 is a schematic flowchart of adaptive sentence segmentation based on a sentence duration and a speech speed according to an embodiment of this application.

For ease of understanding, referring to FIG. 7, FIG. 7 is a schematic flowchart of adaptive sentence segmentation based on a sentence duration and a speech speed according to an embodiment of this application. As shown in the figure, an optional process is described below.

In step C1, the sentence-segmentation apparatus at first acquires to-be-processed speech information.

In step C2, the to-be-processed speech information is then transmitted to a speech front end for processing to output an audio stream of the to-be-processed speech information, a corresponding pause time t, and duration information of this sentence. Content of the processing includes, but is not limited to, reduction of interferences of noise, reverberation, and echo.

In step C3, whether the pause time t is greater than a duration threshold T is determined. The duration threshold T herein is a value obtained after being adjusted according to features of a speech given by a person rather than a value fixed in advance. If the pause time t is greater than the duration threshold T, step C4 is performed, that is, sentence segmentation processing is performed. In another implementation, step C3 may include determining whether the pause time t is greater than or equal to a duration threshold T. When the pause time t is greater than or equal to the duration threshold T, step C4 is performed, that is, sentence segmentation processing is performed.

In step C4, the audio stream is inputted into a speech recognition module and then is recognized as specific subtitles.

In step C5, a recognition result may be expressed as subtitles.

In step C6, a next duration threshold can be adaptively calculated by using the duration information and the speech speed of this sentence. The reason is that, from a perspective of statistics, the duration of each normal sentence has a particular range. Therefore, when the accumulated duration is less than the range, sentence segmentation tends to be performed difficultly. When the accumulated duration is greater than the range, sentence segmentation tends to be performed more easily. From a perspective of statistics, a higher speech speed indicates a shorter pause between sentences, and on the contrary, a lower speech speed indicates a longer pause between sentences. Therefore, the speech speed and the duration threshold are in a negative correlation.

Optionally, in this embodiment of this application, the first manner of calculating a duration threshold by the sentence-segmentation apparatus is described. Both the effect of a result of sentence segmentation of speech and the effect of to-be-processed speech information on a duration threshold can be taken into consideration, and at last, the second threshold is obtained through calculation comprehensively according to the target speech duration, a preset speech duration range, a preset speech speed range, a third preset speech duration, and a maximum speech duration. Through the method above, on one hand, a speech speed in a result of sentence segmentation of speech can be effectively considered. According to the speech speed, a duration threshold is updated continually, bestowing the duration threshold with a better reference value and creditability. On the other hand, information about a sentence duration in to-be-processed speech information can be effectively used. A duration threshold obtained through calculation thereby has a better reference value and credibility.

Optionally, based on the seventh embodiment corresponding to FIG. 3, in an eighth optional embodiment of the sentence-segmentation method according to the embodiments of this application, the calculating the target speech duration according to a speech start moment and a speech end moment of the first to-be-processed speech information may include:

calculating, by the sentence-segmentation apparatus, the target speech duration by using the following manner:

$$d = c_t - s_t;$$

where d represents the target speech duration, $c_t$ represents the speech end moment, and $s_t$ represents the speech start moment; and the calculating, by the sentence-segmentation apparatus, the speech speed at the second moment according to the speech speed at the first moment, the text word number, the target unit time, and a smoothing factor may include:

calculating, by the sentence-segmentation apparatus, the speech speed at the second moment by using the following manner:

$$s_i = \alpha \times s_{i-1} + (1-\alpha) \times \frac{n}{\Delta t};$$

where $s_i$ represents the speech speed at the second moment, $s_{i-1}$ represents the speech speed at the first moment, n represents the text word number, $\Delta t$ represents the target unit time, and $\alpha$ represents the smoothing factor; and the obtaining, by the sentence-segmentation apparatus through calculation, the second threshold according to the target speech duration, a preset speech duration range, a preset speech speed range, a third preset speech duration, and a maximum speech duration includes:

$$T = f_2(d, s) = \begin{cases} T_0(s) \times \left(1 + \frac{D_{low}(s) - d}{D_{low}(s)}\right), & d \leq D_{low}(s) \\ T_0(s), & D_{low}(s) < d < D_{high}(s) \\ T_0(s) \times \max\left(\frac{D_{max} - d}{D_{max} - D_{high}(s)}, 0\right), & d \geq D_{high}(s) \end{cases} ;$$

$$T_0(s) = T_2 \times \left(\max\left(\min\left(\frac{S_{high} - S_i}{S_{high} - S_{low}}, 1\right), 0\right) + 0.5\right).$$

$$D_{low}(s) = D_{low} \times \left(\max\left(\min\left(\frac{S_{high} - S_i}{S_{high} - S_{low}}, 1\right), 0\right) + 0.5\right).$$

$$D_{high}(s) = D_{high} \times \left(\max\left(\min\left(\frac{S_{high} - S_i}{S_{high} - S_{low}}, 1\right), 0\right) + 0.5\right).$$

where T represents the second threshold, $f_2(d, s)$ represents a third threshold calculation function, $T_0(s)$ represents a first intermediate parameter, $D_{low}(s)$ a second intermediate parameter, $D_{high}(s)$ represents a third intermediate parameter, $D_{low}$ represents a minimum value in the preset speech duration range, $D_{high}$ a maximum value in the preset speech duration range, $D_{max}$ represents the maximum speech duration, $T_2$ represents the third preset speech duration, $S_{high}$ represents a maximum value in the preset speech speed range, and $S_{low}$ represent a minimum value in the preset speech speed range.

In this embodiment, the sentence-segmentation apparatus, other than individually using the speech duration or the speech speed information, may further combine the two to calculate the duration threshold, that is, the second threshold T may be expressed as:

$$T = f_2(d, s);$$

where $f_2$ may be any monotonically non-increasing function, that is, expressed as:

$$T = f_2(d, s) = \begin{cases} T_0(s) \times \left(1 + \frac{D_{low}(s) - d}{D_{low}(s)}\right), & d \leq D_{low}(s) \\ T_0(s), & D_{low}(s) < d < D_{high}(s) \\ T_0(s) \times \max\left(\frac{D_{max} - d}{D_{max} - D_{high}(s)}, 0\right), & d \geq D_{high}(s) \end{cases} ;$$

where T represents the second threshold, $f_2(d, s)$ represents a third threshold calculation function, $T_0(s)$ represents a first intermediate parameter, $D_{low}(s)$ a second intermediate parameter, $D_{high}(s)$ represents a third intermediate parameter, $D_{low}$ represents a minimum value in the preset speech duration range, $D_{high}$ a maximum value in the preset speech duration range, $D_{max}$ represents the maximum speech duration, $T_2$ represents the third preset speech duration, $S_{high}$ represents a maximum value in the preset speech speed range, and $S_{low}$ represent a minimum value in the preset speech speed range.

A feasible setting is that $S_{high}$ may be 5 words per second, $S_{low}$ represents 2 words per second, $D_{low}$ may be 2 s, $D_{high}$ may be 8 s, and $D_{max}$ may be 20 s. $T_0(s)$, $D_{low}(s)$, and $D_{high}(s)$ are obtained through calculation respectively by using the foregoing parameters and the following formulas.

$$T_0(s) = T_2 \times \left( \max\left( \min\left( \frac{S_{high} - S_i}{S_{high} - S_{low}}, 1 \right), 0 \right) + 0.5 \right);$$

where $s_i = \alpha \times s_{i-1} + (1 - \alpha) \times \frac{n}{\Delta t}$;

where $s_i$ represents the speech speed at the second moment, $s_{i-1}$ represents the speech speed at the first moment, n represents the text word number, $\Delta t$ represents the target unit time, and α represents the smoothing factor.

A feasible setting is that $s_{i-1}$ may be 3 words per second, n may be 10 words, $\Delta t$ may be 2 s, and α may be 0.9. Therefore, the value of $S_i$ is calculated as 3.2 words per second. It is further assumed that $T_2$ may be 0.5. By combining the foregoing parameters, the value of $T_0(s)$ is calculated as 0.55 s.

Based on the foregoing parameters, the sentence-segmentation apparatus may obtain the value of $D_{high}(s)$ through calculation by using the following formula, that is, $$D_{low}(s) = D_{low} \times \left( \max\left( \min\left( \frac{S_{high} - S_i}{S_{high} - S_{low}}, 1 \right), 0 \right) + 0.5 \right);$$

$= D_{low}(s) = 2 \times (\max(\min(0.6, 1), 0) + 0.5);$ $= D_{low}(s) = 2 \times (0.6 + 0.5);$ $= 2.2s$ Based on the foregoing parameters, the sentence-segmentation apparatus may obtain the value of $D_{high}(s)$ through calculation by using the following formula, that is, $$D_{high}(s) = D_{high} \times \left( \max\left( \min\left( \frac{S_{high} - S_i}{S_{high} - S_{low}}, 1 \right), 0 \right) + 0.5 \right);$$

$= D_{high}(s) = 8 \times (\max(\min(0.6, 1), 0) + 0.5)$ $= D_{high}(s) = 8 \times (0.6 + 0.5);$ $= 8.8s$ Based on $T_0(s)$, $D_{low}(s)$ and $D_{high}(s)$ obtained through calculation, the sentence-segmentation apparatus may obtain the following formula:

$$T = f_2(d, s) = \begin{cases} 0.55 \times \left(1 + \frac{2.2 - d}{2.2}\right), & d \leq 2.2 \\ 0.55, & 2.2 < d < 8.8 \\ 0.55 \times \max\left(\frac{20 - d}{20 - 8.8}, 0\right), & d \geq 8.8 \end{cases}.$$

The speech duration may be equal to $d = c_t - s_t$. If the speech start moment $s_t$ is 12:15:32 and the speech end moment $c_t$ is 12:15:41, the target speech duration d is 9 s.

Assuming that d is 1 s, it may be learned, according to the first formula, that the second threshold T is equal to 0.85 s.

Assuming that d is 5 s, it may be learned, according to the second formula, that the second threshold T is equal to 0.55 s. Assuming that d is 12 s, it may be learned, according to the third formula, that the second threshold T is equal to 0.39 s.

It may be understood that, each of the foregoing parameters is a feasible parameter. During actual application, parameters may be set according to different situations, which is not limited herein.

Optionally, in this embodiment of this application, the specific manner of calculating the second threshold is described. Considering that a different person speaks at a different speech speed, a speech speed of a speaker is used as a basis to determine whether to perform sentence segmentation. A higher speech speed indicates a shorter pause between sentences, and a lower speech speed indicates a longer pause between sentences. Therefore, the speech speed and the threshold of sentence segmentation are in a negative correlation. In addition, considering that each normal sentence has a particular duration range, a pause duration for which a speaker pauses after speaking is used as a basis to determine whether to perform sentence segmentation. When the pause duration is less than the duration range, an algorithm tends to perform sentence segmentation difficultly, and when the pause duration is greater than the range, the algorithm tends to perform sentence segmentation easily. The method above fully takes advantage of features of a speech speed. A duration threshold is generated closer to a speech style of a speaker and the speech speed of the speaker, thereby improving the credibility of duration threshold calculation. In addition, a slower update of a speech speed causes a delay of a client, an unsteady word number feedback, and a quick speech change in a unit time when a calculation is performed. Therefore, introducing the smoothing factor can ensure a more steady result of an algorithm, and further improve the practicability of the solution. Besides, the method above fully takes advantage of features of a sentence duration. A duration threshold is generated closer to a speech style of a speaker and the proper length of a sentence, thereby further improving the credibility of duration threshold calculation.

Figure 8:
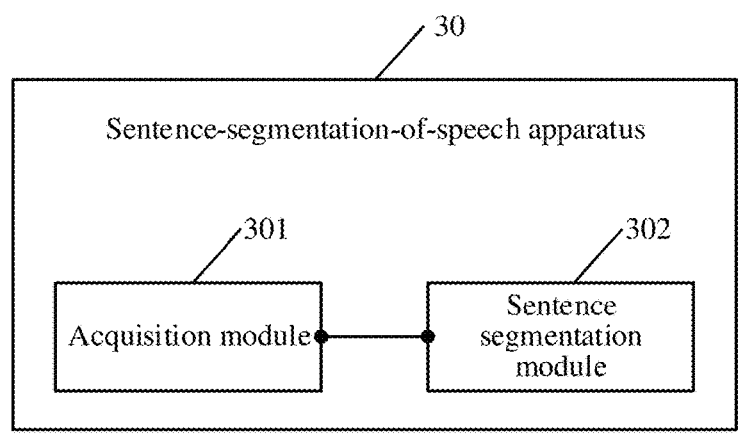
FIG. 8 is a schematic diagram of an embodiment of a sentence-segmentation-of-speech apparatus according to an embodiment of this application.

A sentence-segmentation apparatus in the embodiments of this application is described below in detail. Referring to FIG. 8, FIG. 8 is a schematic diagram of an embodiment of a sentence-segmentation apparatus according to the embodiments of this application. The sentence-segmentation apparatus 30 includes:

an acquisition module 301, configured to acquire first to-be-processed speech information;

the acquisition module 301 being further configured to acquire a first pause duration according to the first to-be-processed speech information; and a sentence segmentation module 302, configured to perform speech recognition on the first to-be-processed speech information to obtain a first result of sentence segmentation of speech in a case that the first pause duration acquired by the acquisition module 301 is greater than or equal to a first threshold, the first result of sentence segmentation of speech being text information, the first threshold being determined according to speech information corresponding to a previous moment.

In this embodiment, an acquisition module 301 acquires first to-be-processed speech information; the acquisition module 301 acquires a first pause duration according to the first to-be-processed speech information; and a sentence segmentation module 302 performs speech recognition on the first to-be-processed speech information to obtain a first result of sentence segmentation of speech in a case that the first pause duration acquired by the acquisition module 301 is greater than or equal to a first threshold, the first result of sentence segmentation of speech being text information, the first threshold being determined according to speech information corresponding to a previous moment.

In the embodiments of this application, a sentence-segmentation apparatus is provided. The sentence-segmentation apparatus at first acquires first to-be-processed speech information, and then can acquire a first pause duration according to the first to-be-processed speech information. In a case that the first pause duration is greater than or equal to a first threshold, the sentence-segmentation apparatus performs speech recognition on the first to-be-processed speech information to obtain a first result of sentence segmentation of speech, the first result of sentence segmentation of speech being text information, the first threshold being determined according to speech information corresponding to a previous moment. Through the method, whether to perform sentence segmentation of speech is determined based on a duration threshold adjusted in real time according to speech information corresponding to a previous moment rather than a fixed duration threshold, thereby catering to features of speech when a person speaks. Therefore, the problem of frequent sentence segmentation or no sentence segmentation in a long time is resolved and the accuracy of sentence segmentation is improved.

Figure 9:
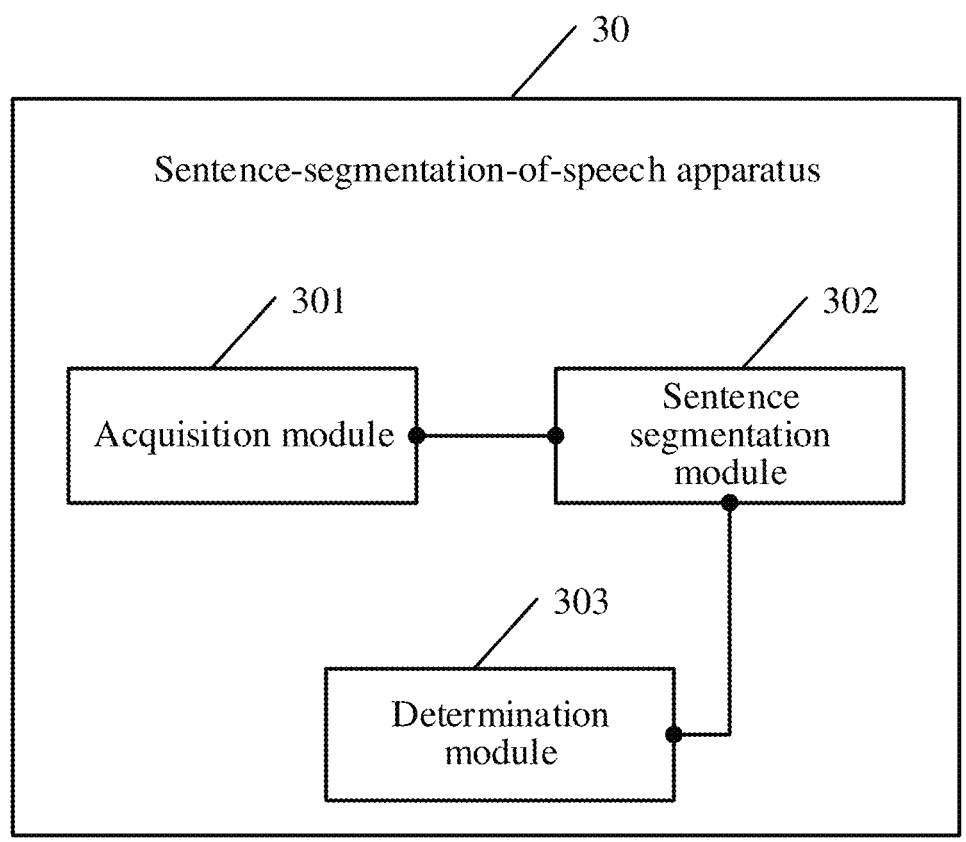
FIG. 9 is a schematic diagram of another embodiment of a sentence-segmentation-of-speech apparatus according to an embodiment of this application.

Optionally, based on the embodiment corresponding to FIG. 8, referring to FIG. 9, in another embodiment of the sentence-segmentation apparatus 30 provided in the embodiments of this application, the sentence-segmentation apparatus 30 further includes a determination module 303, where the determination module 303 is configured to determine a second threshold after the sentence segmentation module 302 performs the speech recognition on the first to-be-processed speech information to obtain the first result of sentence segmentation of speech;

the acquisition module 301 is further configured to acquire second to-be-processed speech information;

the acquisition module 301 is further configured to acquire a second pause duration according to the second to-be-processed speech information; and the sentence segmentation module 302 is further configured to perform speech recognition on the second to-be-processed speech information to obtain a second result of sentence segmentation of speech in a case that the second pause duration acquired by the acquisition module 301 is greater than or equal to the second threshold determined by the determination module, the second result of sentence segmentation of speech being text information.

In addition, in this embodiment of this application, the sentence-segmentation apparatus determines a second threshold, then acquires second to-be-processed speech information, and acquires a second pause duration according to the second to-be-processed speech information. If the second pause duration is greater than or equal to the second threshold, the sentence-segmentation apparatus performs speech recognition on the second to-be-processed speech information to obtain a second result of sentence segmentation of speech, the second result of sentence segmentation of speech being text information. Through the method, a duration threshold can be flexibly adjusted and a new duration threshold is generated according to previous speech information to determine whether to perform sentence segmentation of speech, thereby catering to features of speech when a person speaks. Therefore, the problem of frequent sentence segmentation or no sentence segmentation in a long time is resolved and the accuracy of sentence segmentation is improved.

Optionally, based on the embodiment corresponding to FIG. 9, in another embodiment of the sentence-segmentation apparatus 30 provided in the embodiments of this application, the determination module 303 is specifically configured to determine the second threshold according to a target speech duration;

or determine the second threshold according to a speech speed at a first moment and a speech speed at a second moment;

or determine the second threshold according to a target speech duration, a speech speed at a first moment, and a speech speed at a second moment.

Furthermore, in this embodiment of this application, the sentence-segmentation apparatus calculates the second threshold according to word number information of the first result of sentence segmentation of speech, or calculates the second threshold according to duration information of the first to-be-processed speech information, or calculates the second threshold according to word number information of the first result of sentence segmentation of speech and duration information of the first to-be-processed speech information. Through the method above, a speech speed can be learned by using word number information and an accumulated sentence duration can be learned by using duration information. The speech speed, the accumulated sentence duration, and a combination thereof can each be used as a basis on which a duration threshold is generated, thereby improving the credibility of duration threshold calculation.

Optionally, based on the embodiment corresponding to FIG. 9, in another embodiment of the sentence-segmentation apparatus 30 provided in the embodiments of this application, the determination module 303 is specifically configured to calculate the target speech duration according to a speech start moment and a speech end moment of the first to-be-processed speech information; and obtain the second threshold through calculation according to the target speech duration, a preset speech duration range, a first preset speech duration, and a maximum speech duration.

Optionally, in this embodiment of this application, the first manner of calculating a duration threshold by the sentence-segmentation apparatus is described. A target speech duration may be calculated according to a speech start moment and a speech end moment of the first to-be-processed speech information, and then the second threshold is obtained through calculation according to the target speech duration, a preset speech duration range, a first preset speech duration, and a maximum speech duration. Through the manner above, information about a sentence duration in to-be-processed speech information can be effectively used. A duration threshold obtained through calculation thereby has a better reference value and credibility.

Optionally, based on the embodiment corresponding to FIG. 9, in another embodiment of the sentence-segmentation apparatus 30 provided in the embodiments of this application, the determination module 303 is specifically configured to calculate the target speech duration by using the following manner:

$$d = c_t - s_t;$$

where d represents the target speech duration, $c_t$ represents the speech end moment, and $s_t$ represents the speech start moment; and calculate the second threshold by using the following manner:

$$T = f_0(d) = \begin{cases} T_0 \times \left(1 + \frac{D_{low} - d}{D_{low}}\right), & d \leq D_{low} \\ T_0, & D_{low} < d < D_{high} \\ T_0 \times \max\left(\frac{D_{max} - d}{D_{max} - D_{high}}, 0\right), & d \leq D_{high} \end{cases};$$

where T represents the second threshold, $f_0(d)$ represents a first threshold calculation function, $T_0$ represents the first preset speech duration, $D_{low}$ represents a minimum value in the preset speech duration range, $D_{high}$ represents a maximum value in the preset speech duration range, and $D_{max}$ represents the maximum speech duration.

Optionally, in this embodiment of this application, the specific manner of calculating the second threshold is described. Considering that each normal sentence has a particular duration range, a pause duration for which a speaker pauses after speaking is used as a basis to determine whether to perform sentence segmentation. When the pause duration is less than the duration range, an algorithm tends to perform sentence segmentation difficultly, and when the pause duration is greater than the range, the algorithm tends to perform sentence segmentation easily. The method above fully takes advantage of features of a sentence duration. A duration threshold is generated closer to a speech style of a speaker and the proper length of a sentence, thereby improving the credibility of duration threshold calculation.

Optionally, based on the embodiment corresponding to FIG. 9, in another embodiment of the sentence-segmentation apparatus 30 provided in the embodiments of this application, the determination module 303 is specifically configured to acquire a text word number and a target unit time;

calculate the speech speed at the second moment according to the speech speed at the first moment, the text word number, the target unit time, and a smoothing factor, the first moment being a moment before the second moment; and obtain the second threshold through calculation according to the speech speed at the second moment, a preset speech speed range, and a second preset speech duration.

Optionally, in this embodiment of this application, the first manner of calculating a duration threshold by the sentence-segmentation apparatus is described. A text word number and a target unit time may be acquired. The speech speed at the second moment is then calculated according to the speech speed at the first moment, the text word number, the target unit time, and a smoothing factor, the first moment being a moment before the second moment. At last, the second threshold is obtained through calculation according to the speech speed at the second moment, a preset speech speed range, and a second preset speech duration. Through the method above, a speech speed in a result of sentence segmentation of speech can be effectively considered. According to the speech speed, a duration threshold is updated continually, bestowing the duration threshold with a better reference value and creditability.

Optionally, based on the embodiment corresponding to FIG. 9, in another embodiment of the sentence-segmentation apparatus 30 provided in the embodiments of this application, the determination module 303 is specifically configured to calculate the speech speed at the second moment by using the following manner:

$$s_i = \alpha \times s_{i-1} + (1 - \alpha) \times \frac{n}{\Delta t};$$

where $s_i$ represents the speech speed at the second moment, $s_{i-1}$ represents the speech speed at the first moment, n represents the text word number, $\Delta t$ represents the target unit time, and $\alpha$ represents the smoothing factor; and calculate the second threshold by using the following manner:

$$T = f_1(s) = T_1 \times \left(\max\left(\min\left(\frac{S_{high} - S_i}{S_{high} - S_{low}}, 1\right), 0\right) + 0.5\right);$$

where T represents the second threshold, $f_1(s)$ represents a second threshold calculation function, $T_1$ represents the second preset speech duration, $S_{high}$ represents a maximum value in the preset speech speed range, $S_{low}$ represents a minimum value in the preset speech speed range, and $S_i$ represents the speech speed at the second moment.

Optionally, in this embodiment of this application, the specific manner of calculating the second threshold is described. Considering that a different person speaks at a different speech speed, a speech speed of a speaker is used as a basis to determine whether to perform sentence segmentation. A higher speech speed indicates a shorter pause between sentences, and a lower speech speed indicates a longer pause between sentences. Therefore, the speech speed and the threshold of sentence segmentation are in a negative correlation. The method above fully takes advantage of features of a speech speed. A duration threshold is generated closer to a speech style of a speaker and the speech speed of the speaker, thereby improving the credibility of duration threshold calculation. In addition, a slower update of a speech speed causes a delay of a client, an unsteady word number feedback, and a quick speech change in a unit time when a calculation is performed. Therefore, introducing the smoothing factor can ensure a more steady result of an algorithm, and further improve the practicability of the solution.

Optionally, based on the embodiment corresponding to FIG. 9, in another embodiment of the sentence-segmentation apparatus 30 provided in the embodiments of this application, the determination module 303 is specifically configured to calculate the target speech duration according to a speech start moment and a speech end moment of the first to-be-processed speech information; and acquire a text word number and a target unit time;

calculate the speech speed at the second moment according to the speech speed at the first moment, the text word number, the target unit time, and a smoothing factor, the first moment being a moment before the second moment; and obtain the second threshold through calculation according to the target speech duration, a preset speech duration range, a preset speech speed range, a third preset speech duration, and a maximum speech duration.

Optionally, in this embodiment of this application, the first manner of calculating a duration threshold by the sentence-segmentation apparatus is described. Both the effect of a result of sentence segmentation of speech and the effect of to-be-processed speech information on a duration threshold can be taken into consideration, and at last, the second threshold is obtained through calculation comprehensively according to the target speech duration, a preset speech duration range, a preset speech speed range, a third preset speech duration, and a maximum speech duration. Through the method above, on one hand, a speech speed in a result of sentence segmentation of speech can be effectively considered. According to the speech speed, a duration threshold is updated continually, bestowing the duration threshold with a better reference value and creditability. On the other hand, information about a sentence duration in to-be-processed speech information can be effectively used. A duration threshold obtained through calculation thereby has a better reference value and credibility.

Optionally, based on the embodiment corresponding to FIG. 9, in another embodiment of the sentence-segmentation apparatus 30 provided in the embodiments of this application, the determination module 303 is specifically configured to calculate the target speech duration by using the following manner:

$$d = c_t - s_t;$$

where d represents the target speech duration, $c_t$ represents the speech end moment, and $s_t$ represents the speech start moment; and calculate the speech speed at the second moment by using the following manner:

$$s_i = \alpha \times s_{i-1} + (1-\alpha) \times \frac{n}{\Delta t};$$

where $s_i$ represents the speech speed at the second moment, $s_{i-1}$ represents the speech speed at the first moment, n represents the text word number, $\Delta t$ represents the target unit time, and $\alpha$ represents the smoothing factor; and the obtaining the second threshold through calculation according to the target speech duration, a preset speech duration range, a preset speech speed range, a third preset speech duration, and a maximum speech duration includes:

calculating the second threshold by using the following manner:

$$T =$$

$$f_2(d, s) = \begin{cases} T_0(s) \times \left(1 + \frac{D_{low}(s) - d}{D_{low}(s)}\right), & d \leq D_{low}(s) \\ T_0(s), & D_{low}(s) < d < D_{high}(s); \\ T_0(s) \times \max\left(\frac{D_{max} - d}{D_{max} - D_{high}(s)}, 0\right), & d \geq D_{high}(s) \end{cases}$$

$$T_0(s) = T_2 \times \left(\max\left(\min\left(\frac{S_{high} - S_i}{S_{high} - S_{low}}, 1\right), 0\right) + 0.5\right);$$

$$D_{low}(s) = D_{low} \times \left(\max\left(\min\left(\frac{S_{high} - S_i}{S_{high} - S_{low}}, 1\right), 0\right) + 0.5\right); \text{ and}$$

$$D_{high}(s) = D_{high} \times \left(\max\left(\min\left(\frac{S_{high} - S_i}{S_{high} - S_{low}}, 1\right), 0\right) + 0.5\right);$$

where T represents the second threshold, $f_2(d, s)$ represents a third threshold calculation function, $T_0(s)$ represents a first intermediate parameter, $D_{low}(s)$ a second intermediate parameter, $D_{high}(s)$ represents a third intermediate parameter, $D_{low}$ represents a minimum value in the preset speech duration range, $D_{high}$ a maximum value in the preset speech duration range, $D_{max}$ represents the maximum speech duration, $T_2$ represents the third preset speech duration, $S_{high}$ represents a maximum value in the preset speech speed range, and $S_{low}$ represent a minimum value in the preset speech speed range.

Optionally, in this embodiment of this application, the specific manner of calculating the second threshold is described. Considering that a different person speaks at a different speech speed, a speech speed of a speaker is used as a basis to determine whether to perform sentence segmentation. A higher speech speed indicates a shorter pause between sentences, and a lower speech speed indicates a longer pause between sentences. Therefore, the speech speed and the threshold of sentence segmentation are in a negative correlation. In addition, considering that each normal sentence has a particular duration range, a pause duration for which a speaker pauses after speaking is used as a basis to determine whether to perform sentence segmentation. When the pause duration is less than the duration range, an algorithm tends to perform sentence segmentation difficultly, and when the pause duration is greater than the range, the algorithm tends to perform sentence segmentation easily. The method above fully takes advantage of features of a speech speed. A duration threshold is generated closer to a speech style of a speaker and the speech speed of the speaker, thereby improving the credibility of duration threshold calculation. In addition, a slower update of a speech speed causes a delay of a client, an unsteady word number feedback, and a quick speech change in a unit time when a calculation is performed. Therefore, introducing the smoothing factor can ensure a more steady result of an algorithm, and further improve the practicability of the solution. Besides, the method above fully takes advantage of features of a sentence duration. A duration threshold is generated closer to a speech style of a speaker and the proper length of a sentence, thereby optionally improving the credibility of duration threshold calculation.

Figure 10:
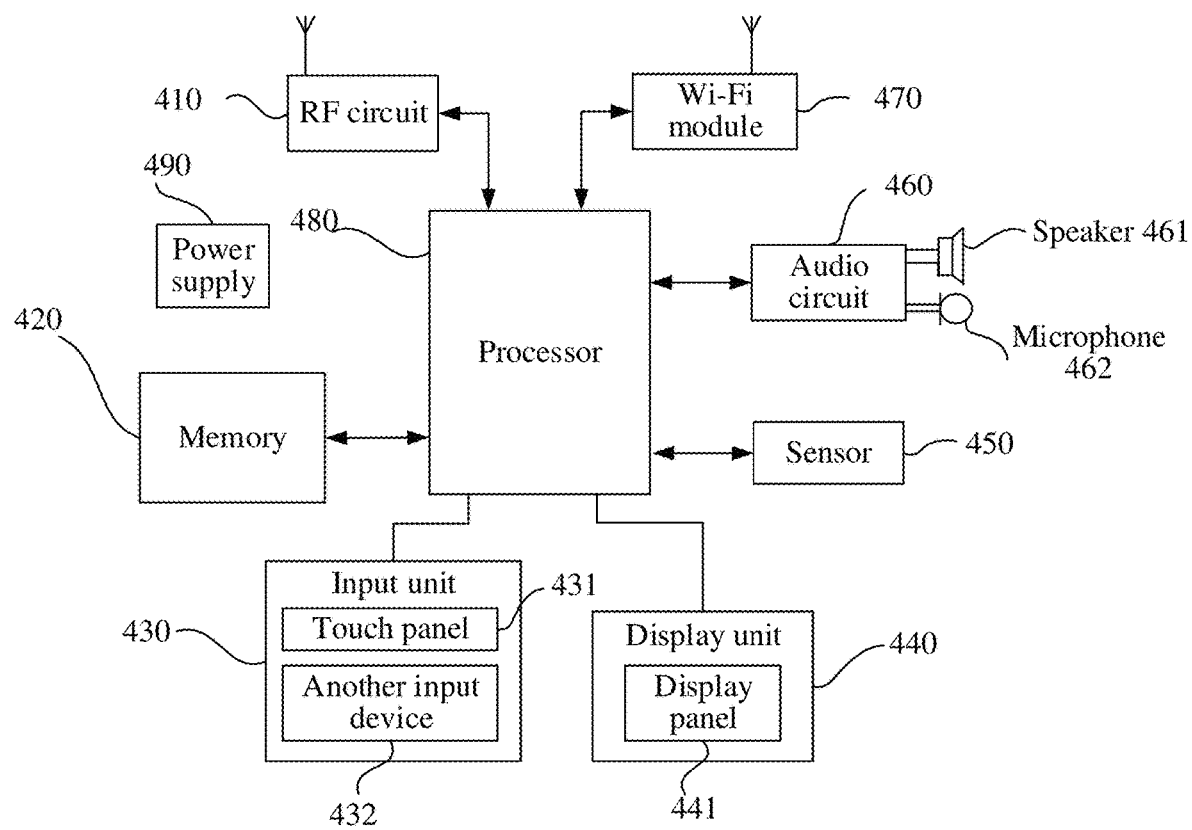
FIG. 10 is a schematic structural diagram of a sentence-segmentation-of-speech apparatus according to an embodiment of this application.

An embodiment of this application further provides another sentence-segmentation apparatus. As shown in FIG. 10, for ease of description, only parts related to the embodiments of this application are shown. For specific technical details that are not disclosed, refer to the method part in the embodiments of this application. The terminal may be any terminal device including a mobile phone, a tablet computer, a personal digital assistant (PDA), a point of sales (POS), an on-board computer, and the like, and the terminal being a mobile phone is used as an example.

FIG. 10 is a block diagram of a partial structure of a mobile phone related to a terminal according to an embodiment of this application. Referring to FIG. 10, the mobile phone includes components such as: a radio frequency (RF) circuit 410, a memory 420, an input unit 430, a display unit 440, a sensor 450, an audio circuit 460, a wireless fidelity (Wi-Fi) module 470, a processor 480, and a power supply 490. A person skilled in the art may understand that the mobile phone structure shown in FIG. 10 constitutes no limitation on the mobile phone, and the mobile phone may include more or fewer components than those shown in the figure, or some components are combined, or a different component deployment is used.

The following optionally describes the components of the mobile phone with reference to FIG. 10.

The RF circuit 410 may be configured to receive and transmit signals during an information receiving and transmitting process or a call process. Specifically, the RF circuit receives downlink information from a base station, then delivers the downlink information to the processor 480 for processing, and transmits designed uplink data to the base station. Generally, the RF circuit 410 includes, but is not limited to, an antenna, at least one amplifier, a transceiver, a coupler, a low noise amplifier (LNA), a duplexer, and the like. In addition, the RF circuit 410 may also communicate with a network and another device through wireless communication. The wireless communication may use any communication standard or protocol, including, but not limited to a global system for mobile communications (GSM), a general packet radio service (GPRS), code division multiple access (CDMA), wideband code division multiple access (WCDMA), Long Term Evolution (LTE), an email, a short messaging service (SMS), and the like.

The memory 420 may be configured to store a software program and module. The processor 480 runs the software program and module stored in the memory 420, to implement various functional applications of the mobile phone and data processing. The memory 420 may mainly include a program storage area and a data storage area. The program storage area may store an operating system, an application program required for at least one function (such as an audio playing function and an image playing function) and the like. The data storage area may store data (such as audio data and a phone book, etc.) created according to use of the mobile phone. In addition, the memory 420 may include a high-speed random access memory, or may also include a non-volatile memory such as at least one disk storage device, a flash memory device, or another volatile solid-state storage device.

The input unit 430 may be configured to receive an entered numeral or character information, and generate key signal input related to user setting and function control of the mobile phone. Optionally, the input unit 430 may include a touch panel 431 and another input device 432. The touch panel 431, also referred to as a touchscreen, may collect a touch operation performed by a user on or near the touch panel (such as an operation performed by a user on the touch panel 431 or near the touch panel 431 by using any proper object or accessory, such as a finger or a stylus), and drive a corresponding connecting device according to a preset program. Optionally, the touch panel 431 may include two parts: a touch detection apparatus and a touch controller. The touch detection apparatus detects a touch position of a user, detects a signal generated by the touch operation, and transfers the signal to the touch controller. The touch controller receives the touch information from the touch detection apparatus, converts the touch information into touch point coordinates, and transmits the touch point coordinates to the processor 480. Moreover, the touch controller can receive and execute a command sent from the processor 480. In addition, the touch panel 431 may be a touch panel of a resistive, capacitive, infrared, or surface acoustic wave type. In addition to the touch panel 431, the input unit 430 may further include another input device 432. Optionally, the another input device 432 may include, but is not limited to, one or more of a physical keyboard, a functional key (such as a volume control key or a switch key), a track ball, a mouse, and a joystick.

The display unit 440 may be configured to display information entered by the user or information provided for the user, and various menus of the mobile phone. The display unit 440 may include a display panel 441. Optionally, the display panel 441 may be configured in the form of a liquid crystal display (LCD), an organic light-emitting diode (OLED), or the like. Optionally, the touch panel 431 may cover the display panel 441. After detecting a touch operation on or near the touch panel 431, the touch panel 431 transfers the touch operation to the processor 480, to determine a type of a touch event. Then, the processor 480 provides a corresponding visual output on the display panel 441 according to the type of the touch event. Although, in FIG. 10, the touch panel 431 and the display panel 441 are used as two separate parts to implement input and output functions of the mobile phone, in some embodiments, the touch panel 431 and the display panel 441 may be integrated to implement the input and output functions of the mobile phone.

The mobile phone may further include at least one sensor 450 such as an optical sensor, a motion sensor, and other sensors. Optionally, the optical sensor may include an ambient light sensor and a proximity sensor, where the ambient light sensor may adjust luminance of the display panel 441 according to the luminance of the ambient light, and the proximity sensor may switch off the display panel 441 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 460, a speaker 461, and a microphone 462 may provide audio interfaces between a user and the mobile phone. The audio circuit 460 may convert received audio data into an electric signal and transmit the electric signal to the speaker 461. The speaker 461 converts the electric signal into a sound signal for output. On the other hand, the microphone 462 converts a collected sound signal into an electric signal. The audio circuit 460 receives the electric signal and converts the electric signal into audio data, and outputs the audio data to the processor 480 for processing. Then, the processor 480 transmits the audio data to, for example, another mobile phone by using the RF circuit 410, or outputs the audio data to the memory 420 for further processing.

Wi-Fi is a short distance wireless transmission technology. The mobile phone may help, by using a Wi-Fi module 470, the user to receive and transmit emails, browse a webpage, access streaming media, and the like, which provides wireless broadband Internet access for the user. Although FIG. 10 shows the Wi-Fi module 470, it may be understood that the Wi-Fi module 470 is not a necessary component of the mobile phone, and when required, the Wi-Fi module 470 may be omitted without changing the scope of the essence of the present disclosure.

The processor 480 is the control center of the mobile phone, and is connected to various parts of the mobile phone by using various interfaces and lines. By running or executing the software program and/or module stored in the memory 420, and invoking data stored in the memory 420, the processor 480 performs various functions and data processing of the mobile phone, thereby performing overall monitoring on the mobile phone. Optionally, the processor 480 may include one or more processing units. Optionally, the processor 480 may integrate an application processor and a modem processor. The application processor mainly processes an operating system, a user interface, an application program, and the like. The modem processor mainly processes wireless communication. It may be understood that the foregoing modem may not be integrated into the processor 480.

The mobile phone further includes the power supply 490 (such as a battery) for supplying power to the components. Optionally, the power supply may be logically connected to the processor 480 by using a power management system, thereby implementing functions such as charging, discharging and power consumption management by using the power management system.

Although not shown in the figure, the mobile phone may further include a camera, a Bluetooth module, and the like, which are not further described herein.

In the embodiments of this application, the processor 480 included in the terminal further has the following functions:

acquiring first to-be-processed speech information;

acquiring a first pause duration according to the first to-be-processed speech information;

performing, by the sentence-segmentation apparatus, speech recognition on the first to-be-processed speech information to obtain a first result of sentence segmentation of speech in a case that the first pause duration is greater than or equal to a first threshold, the first result of sentence segmentation of speech being text information;

determining a second threshold according to the first result of sentence segmentation of speech and/or the first to-be-processed speech information;

acquiring second to-be-processed speech information, the second to-be-processed speech information being acquired after the first to-be-processed speech information;

acquiring a second pause duration according to the second to-be-processed speech information; and performing, by the sentence-segmentation apparatus, speech recognition on the second to-be-processed speech information to obtain a second result of sentence segmentation of speech in a case that the second pause duration is greater than or equal to the second threshold, the second result of sentence segmentation of speech being text information.

In the embodiments of this application, the processor 480 included in the terminal further has the following functions:

acquiring first to-be-processed speech information;

acquiring a first pause duration according to the first to-be-processed speech information;

performing speech recognition on the first to-be-processed speech information to obtain a first result of sentence segmentation of speech in a case that the first pause duration is greater than or equal to a first threshold, the first result of sentence segmentation of speech being text information, the first threshold being determined according to speech information corresponding to a previous moment.

Optionally, the processor 480 is further configured to perform the following steps:

determining a second threshold;

acquiring second to-be-processed speech information;

acquiring a second pause duration according to the second to-be-processed speech information; and performing, by the sentence-segmentation apparatus, speech recognition on the second to-be-processed speech information to obtain a second result of sentence segmentation of speech in a case that the second pause duration is greater than or equal to the second threshold, the second result of sentence segmentation of speech being text information.

Optionally, the processor 480 is specifically configured to perform the following step:

determining the second threshold according to a target speech duration;

or determining the second threshold according to a speech speed at a first moment and a speech speed at a second moment;

or determining the second threshold according to a target speech duration, a speech speed at a first moment, and a speech speed at a second moment.

Optionally, the processor 480 is specifically configured to perform the following steps:

calculating the target speech duration according to a speech start moment and a speech end moment of the first to-be-processed speech information; and obtaining the second threshold through calculation according to the target speech duration, a preset speech duration range, a first preset speech duration, and a maximum speech duration.

Optionally, the processor 480 is specifically configured to perform the following steps:

calculating the target speech duration by using the following manner:

$$d = c_t - s_t;$$

where d represents the target speech duration, $c_t$ represents the speech end moment, and $s_t$ represents the speech start moment; and calculating the second threshold by using the following manner:

$$T = f_0(d) = \begin{cases} T_0 \times \left(1 + \dfrac{D_{low} - d}{D_{low}}\right), & d \leq D_{low} \\ T_0, & D_{low} < d < D_{high} \\ T_0 \times \max\left(\dfrac{D_{max} - d}{D_{max} - D_{high}}, 0\right), & d \geq D_{high} \end{cases};$$

where T represents the second threshold, $f_0(d)$ represents a first threshold calculation function, $T_0$ represents the first preset speech duration, $D_{low}$ represents a minimum value in the preset speech duration range, $D_{high}$ represents a maximum value in the preset speech duration range, and $D_{max}$ represents the maximum speech duration.

Optionally, the processor 480 is specifically configured to perform the following steps:

acquiring a text word number and a target unit time;

calculating the speech speed at the second moment according to the speech speed at the first moment, the text word number, the target unit time, and a smoothing factor, the first moment being a moment before the second moment; and obtaining the second threshold through calculation according to the speech speed at the second moment, a preset speech speed range, and a second preset speech duration.

Optionally, the processor 480 is specifically configured to perform the following steps:

calculating the target speech duration by using the following manner:

$$d = c_t - s_t;$$

where d represents the target speech duration, $c_t$ represents the speech end moment, and $s_t$ represents the speech start moment; and calculating the second threshold by using the following manner:

$$T = f_0(d) = \begin{cases} T_0 \times \left(1 + \dfrac{D_{low} - d}{D_{low}}\right), & d \leq D_{low} \\ T_0, & D_{low} < d < D_{high} \\ T_0 \times \max\left(\dfrac{D_{max} - d}{D_{max} - D_{high}}, 0\right), & d \geq D_{high} \end{cases};$$

where T represents the second threshold, $f_0(d)$ represents a first threshold calculation function, $T_0$ represents the first preset speech duration, $D_{low}$ represents a minimum value in the preset speech duration range, $D_{high}$ represents a maximum value in the preset speech duration range, and $D_{max}$ represents the maximum speech duration.

Optionally, the processor 480 is specifically configured to perform the following steps:

calculating the target speech duration according to a speech start moment and a speech end moment of the first to-be-processed speech information;

acquiring a text word number and a target unit time;

calculating the speech speed at the second moment according to the speech speed at the first moment, the text word number, the target unit time, and a smoothing factor, the first moment being a moment before the second moment; and obtaining the second threshold through calculation according to the target speech duration, a preset speech duration range, a preset speech speed range, a third preset speech duration, and a maximum speech duration.

Optionally, the processor 480 is specifically configured to perform the following steps:

calculating the target speech duration by using the following manner:

$$d = c_t - s_t;$$

where d represents the target speech duration, $c_t$ represents the speech end moment, and $s_t$ represents the speech start moment;

calculating the speech speed at the second moment by using the following manner:

$$s_i = \alpha \times s_{i-1} + (1 - \alpha) \times \frac{n}{\Delta t};$$

where $s_i$ represents the speech speed at the second moment, $s_{i-1}$ represents the speech speed at the first moment, n represents the text word number, $\Delta t$ represents the target unit time, and $\alpha$ represents the smoothing factor; and calculating the second threshold by using the following manner:

$$T =$$

$$f_2(d, s) = \begin{cases} T_0(s) \times \left(1 + \dfrac{D_{low}(s) - d}{D_{low}(s)}\right), & d \leq D_{low}(s) \\ T_0(s), & D_{low}(s) < d < D_{high}(s) \\ T_0(s) \times \max\left(\dfrac{D_{max} - d}{D_{max} - D_{high}(s)}, 0\right), & d \geq D_{high}(s) \end{cases};$$

$$T_0(s) = T_2 \times \left(\max\left(\min\left(\frac{S_{high} - S_i}{S_{high} - S_{low}}, 1\right), 0\right) + 0.5\right);$$

$$D_{low}(s) = D_{low} \times \left(\max\left(\min\left(\frac{S_{high} - S_i}{S_{high} - S_{low}}, 1\right), 0\right) + 0.5\right); \text{ and}$$

$$D_{high}(s) = D_{high} \times \left(\max\left(\min\left(\frac{S_{high} - S_i}{S_{high} - S_{low}}, 1\right), 0\right) + 0.5\right);$$

where T represents the second threshold, $f_2(d, s)$ represents a third threshold calculation function, $T_0(s)$ represents a first intermediate parameter, $D_{low}(s)$ a second intermediate parameter, $D_{high}(s)$ represents a third intermediate parameter, $D_{low}$ represents a minimum value in the preset speech duration range, $D_{high}$ a maximum value in the preset speech duration range, $D_{max}$ represents the maximum speech duration, $T_2$ represents the third preset speech duration, $S_{high}$ represents a maximum value in the preset speech speed range, and $S_{low}$ represent a minimum value in the preset speech speed range.

A person skilled in the art may clearly understand that, for the purpose of convenient and brief description, for specific work processes of the foregoing described system, apparatus, and unit, reference may be made to corresponding processes in the foregoing method embodiments, and details are not described herein again.

In some embodiments provided in the embodiments of this application, it is to be understood that the disclosed system, apparatus, and method may be implemented in other manners. For example, the described apparatus embodiments above are merely exemplary. For example, the unit division is merely logical function division and there may be other division manners during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application can be integrated into one processing unit, or each of the units can exist alone physically, or two or more units are integrated into one unit. The foregoing integrated unit can be implemented in the form of hardware, or can be implemented in the form of a software function unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the related technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing embodiments are merely provided for describing the technical solutions of the embodiments of this application, but not intended to limit this application. A person of ordinary skill in the art shall understand that although the embodiments of this application have been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of this application.

This application uses the following steps: acquiring first to-be-processed speech information; acquiring a first pause duration according to the first to-be-processed speech information; and performing speech recognition on the first to-be-processed speech information to obtain a first result of sentence segmentation of speech in a case that the first pause duration is greater than or equal to a first threshold, the first result of sentence segmentation of speech being text information, the first threshold being determined according to speech information corresponding to a previous moment. The sentence-segmentation apparatus caters to features of speech when a person speaks, thereby resolving the problem of frequent sentence segmentation or no sentence segmentation in a long time and improving the accuracy of sentence segmentation.

What is claimed is:

1. A method for performing speech recognition, comprising:
   acquiring, by an apparatus comprising a memory storing instructions and a processor in communication with the memory, first to-be-processed speech information;
   acquiring, by the apparatus, a first pause duration according to the first to-be-processed speech information;
   in response to the first pause duration being greater than or equal to a first threshold, performing, by the apparatus, speech recognition on the first to-be-processed speech information to obtain a first result of sentence segmentation of speech, the first result of sentence segmentation of speech being text information, the first threshold being determined according to speech information corresponding to a previous moment;
   determining, by the apparatus, a second threshold according to at least one of the following:
   a target speech duration;
   a speech speed at a first moment and a speech speed at a second moment; or
   a target speech duration, a speech speed at a first moment, and a speech speed at a second moment;
   acquiring, by the apparatus, second to-be-processed speech information;
   acquiring, by the apparatus, a second pause duration according to the second to-be-processed speech information;
   in response to the second pause duration being greater than or equal to the second threshold, performing, by the apparatus, speech recognition on the second to-be-processed speech information to obtain a second result of sentence segmentation of speech, the second result of sentence segmentation of speech being text information; and wherein the determining the second threshold according to the speech speed at the first moment and the speech speed at the second moment comprises:
   acquiring, by the apparatus, a text word number and a target unit time;
   calculating, by the apparatus, the speech speed at the second moment according to the speech speed at the first moment, the text word number, the target unit time, and a smoothing factor, the first moment being a moment before the second moment; and
   obtaining, by the apparatus through calculation, the second threshold according to the speech speed at the second moment, a preset speech speed range, and a second preset speech duration.

2. The method according to claim 1, wherein the determining the second threshold according to the target speech duration comprises:
   calculating, by the apparatus, the target speech duration according to a speech start moment and a speech end moment of the first to-be-processed speech information; and
   obtaining, by the apparatus through calculation, the second threshold according to the target speech duration, a preset speech duration range, a first preset speech duration, and a maximum speech duration.

3. The method according to claim 2, wherein:
   the calculating the target speech duration according to the speech start moment and the speech end moment of the first to-be-processed speech information comprises:
   calculating, by the apparatus, the target speech duration by using the following manner:

$$d = c_t - s_t$$

wherein d represents the target speech duration, $c_t$ represents the speech end moment, and $s_t$ represents the speech start moment; and
   the obtaining, by the apparatus through calculation, the second threshold according to the target speech duration, the preset speech duration range, the first preset speech duration, and the maximum speech duration comprises:
   calculating, by the apparatus, the second threshold by using the following manner:

$$T = f_0(d) = \begin{cases} T_0 \times \left(1 + \dfrac{D_{low} - d}{D_{low}}\right), & d \leq D_{low} \\ T_0, & D_{low} < d < D_{high} \\ T_0 \times \max\left(\dfrac{D_{max} - d}{D_{max} - D_{high}}, 0\right), & d \leq D_{high} \end{cases}$$

wherein T represents the second threshold, $f_0(d)$ represents a first threshold calculation function, $T_0$ represents the first preset speech duration, $D_{low}$ represents a minimum value in the preset speech duration range, $D_{high}$ represents a maximum value in the preset speech duration range, and $D_{max}$ represents the maximum speech duration.

4. The method according to claim 1, wherein:
   the calculating the speech speed at the second moment according to the speech speed at the first moment, the text word number, the target unit time, and the smoothing factor comprises:
   calculating, by the apparatus, the speech speed at the second moment by using the following manner:

$$s_i = \alpha \times s_{i-1} + (1-\alpha) \times \frac{n}{\Delta t},$$

wherein $s_i$ represents the speech speed at the second moment, $s_{i-1}$ represents the speech speed at the first moment, n represents the text word number, $\Delta t$ represents the target unit time, and $\alpha$ represents the smoothing factor; and the obtaining, by the apparatus through calculation, the second threshold according to the speech speed at the second moment, the preset speech speed range, and the second preset speech duration comprises:
calculating, by the apparatus, the second threshold by using the following manner:

$$T = f_1(s) = T_1 \times \left( \max\left( \min\left( \frac{S_{high} - S_i}{S_{high} - S_{low}}, 1 \right), 0 \right) + 0.5 \right),$$

wherein T represents the second threshold, $f_1(s)$ represents a second threshold calculation function, $T_1$ represents the second preset speech duration, $S_{high}$ represents a maximum value in the preset speech speed range, $S_{low}$ represents a minimum value in the preset speech speed range, and $S_i$ represents the speech speed at the second moment.

5. An apparatus for performing speech recognition, the apparatus comprising:
a memory storing instructions; and
a processor in communication with the memory, wherein, when the processor executes the instructions, the processor is configured to cause the apparatus to:
acquire first to-be-processed speech information,
acquire a first pause duration according to the first to-be-processed speech information,
in response to the first pause duration being greater than or equal to a first threshold, perform speech recognition on the first to-be-processed speech information to obtain a first result of sentence segmentation of speech, the first result of sentence segmentation of speech being text information, the first threshold being determined according to speech information corresponding to a previous moment;
determine a second threshold according to at least one of the following:
a target speech duration;
a speech speed at a first moment and a speech speed at a second moment; or
a target speech duration, a speech speed at a first moment, and a speech speed at a second moment,
acquire second to-be-processed speech information,
acquire a second pause duration according to the second to-be-processed speech information,
in response to the second pause duration being greater than or equal to the second threshold, perform speech recognition on the second to-be-processed speech information to obtain a second result of sentence segmentation of speech, the second result of sentence segmentation of speech being text information, and
wherein, when the processor is configured to cause the apparatus to determine the second threshold according to the speech speed at the first moment and the speech speed at the second moment, the processor is configured to cause the apparatus to:
acquire a text word number and a target unit time;
calculate the speech speed at the second moment according to the speech speed at the first moment, the text word number, the target unit time, and a smoothing factor, the first moment being a moment before the second moment; and
obtain, through calculation, the second threshold according to the speech speed at the second moment, a preset speech speed range, and a second preset speech duration.

6. The apparatus according to claim 5, wherein, when the processor is configured to cause the apparatus to determine the second threshold according to the target speech duration, the processor is configured to further cause the apparatus to:
calculate the target speech duration according to a speech start moment and a speech end moment of the first to-be-processed speech information; and
obtain, through calculation, the second threshold according to the target speech duration, a preset speech duration range, a first preset speech duration, and a maximum speech duration.

7. The apparatus according to claim 6, wherein:
when the processor is configured to cause the apparatus to calculate the target speech duration according to the speech start moment and the speech end moment of the first to-be-processed speech information, the processor is configured to further cause the apparatus to:
calculate the target speech duration by using the following manner:

$$d = c_t - s_t;$$

wherein d represents the target speech duration, $c_t$ represents the speech end moment, and $s_t$ represents the speech start moment; and
when the processor is configured to cause the apparatus to obtain, through calculation, the second threshold according to the target speech duration, the preset speech duration range, the first preset speech duration, and the maximum speech duration, the processor is configured to further cause the apparatus to:
calculate the second threshold by using the following manner:

$$T = f_0(d) = \begin{cases} T_0 \times \left(1 + \frac{D_{low} - d}{D_{low}}\right), & d \le D_{low} \\ T_0, & D_{low} < d < D_{high} \\ T_0 \times \max\left(\frac{D_{max} - d}{D_{max} - D_{high}}, 0\right), & d \ge D_{high} \end{cases}$$

wherein T represents the second threshold, $f_0(d)$ represents a first threshold calculation function, $T_0$ represents the first preset speech duration, $D_{low}$ represents a minimum value in the preset speech duration range, $D_{high}$ represents a maximum value in the preset speech duration range, and $D_{max}$ represents the maximum speech duration.

8. The apparatus according to claim 5, wherein:
when the processor is configured to cause the apparatus to calculate the speech speed at the second moment according to the speech speed at the first moment, the text word number, the target unit time, and the smoothing factor, the processor is configured to further cause the apparatus to:
calculate the speech speed at the second moment by using the following manner:

$$s_i = \alpha \times s_{i-1} + (1-\alpha) \times \frac{n}{\Delta t},$$

wherein $s_i$ represents the speech speed at the second moment, $s_{i-1}$ represents the speech speed at the first moment, n represents the text word number, $\Delta t$ represents the target unit time, and $\alpha$ represents the smoothing factor; and when the processor is configured to cause the apparatus to obtain, through calculation, the second threshold according to the speech speed at the second moment, the preset speech speed range, and the second preset speech duration, the processor is configured to further cause the apparatus to:

calculate the second threshold by using the following manner:

$$T = f_1(s) = T_1 \times \left( \max\left( \min\left( \frac{S_{high} - S_i}{S_{high} - S_{low}}, 1 \right), 0 \right) + 0.5 \right),$$

wherein T represents the second threshold, $f_1(s)$ represents a second threshold calculation function, $T_1$ represents the second preset speech duration, $S_{high}$ represents a maximum value in the preset speech speed range, $S_{low}$ represents a minimum value in the preset speech speed range, and $S_i$ represents the speech speed at the second moment.

9. A non-transitory computer readable storage medium storing computer readable instructions, wherein, the computer readable instructions, when executed by a processor, are configured to cause the processor to perform:
acquiring first to-be-processed speech information;
acquiring a first pause duration according to the first to-be-processed speech information; and
in response to the first pause duration being greater than or equal to a first threshold, performing speech recognition on the first to-be-processed speech information to obtain a first result of sentence segmentation of speech, the first result of sentence segmentation of speech being text information, the first threshold being determined according to speech information corresponding to a previous moment;
determining a second threshold according to at least one of the following:
a target speech duration;
a speech speed at a first moment and a speech speed at a second moment; or
a target speech duration, a speech speed at a first moment, and a speech speed at a second moment;
acquiring second to-be-processed speech information;
acquiring a second pause duration according to the second to-be-processed speech information;
in response to the second pause duration being greater than or equal to the second threshold, performing speech recognition on the second to-be-processed speech information to obtain a second result of sentence segmentation of speech, the second result of sentence segmentation of speech being text information; and
wherein the determining the second threshold according to the speech speed at the first moment and the speech speed at the second moment comprises:
acquiring a text word number and a target unit time;
calculating the speech speed at the second moment according to the speech speed at the first moment, the text word number, the target unit time, and a smoothing factor, the first moment being a moment before the second moment; and
obtaining, through calculation, the second threshold according to the speech speed at the second moment, a preset speech speed range, and a second preset speech duration.

10. The non-transitory computer readable storage medium according to claim 9, wherein, when the computer readable instructions are configured to cause the processor to perform determining the second threshold according to the target speech duration, the computer readable instructions are configured to cause the processor to perform:
calculating the target speech duration according to a speech start moment and a speech end moment of the first to-be-processed speech information; and
obtaining, through calculation, the second threshold according to the target speech duration, a preset speech duration range, a first preset speech duration, and a maximum speech duration.

11. The non-transitory computer readable storage medium according to claim 10, wherein:
when the computer readable instructions are configured to cause the processor to perform calculating the target speech duration according to the speech start moment and the speech end moment of the first to-be-processed speech information, the computer readable instructions are configured to cause the processor to perform:
calculating the target speech duration by using the following manner:

$$d = c_t - s_t;$$

wherein d represents the target speech duration, $c_t$ represents the speech end moment, and $s_t$ represents the speech start moment; and
when the computer readable instructions are configured to cause the processor to perform obtaining, through calculation, the second threshold according to the target speech duration, the preset speech duration range, the first preset speech duration, and the maximum speech duration, the computer readable instructions are configured to cause the processor to perform:
calculating the second threshold by using the following manner:

$$T = f_0(d) = \begin{cases} T_0 \times \left(1 + \frac{D_{low} - d}{D_{low}}\right), & d \leq D_{low} \\ T_0, & D_{low} < d < D_{high} \\ T_0 \times \max\left(\frac{D_{max} - d}{D_{max} - D_{high}}, 0\right), & d \leq D_{high} \end{cases}$$

wherein T represents the second threshold, $f_0(d)$ represents a first threshold calculation function, $T_0$ represents the first preset speech duration, $D_{low}$ represents a minimum value in the preset speech duration range, $D_{high}$ represents a maximum value in the preset speech duration range, and $D_{max}$ represents the maximum speech duration.

12. The non-transitory computer readable storage medium according to claim 9, wherein:
when the computer readable instructions are configured to cause the processor to perform calculating the speech speed at the second moment according to the speech speed at the first moment, the text word number, the target unit time, and the smoothing factor, the computer readable instructions are configured to cause the processor to perform:

calculating the speech speed at the second moment by using the following manner:

$$s_i = \alpha \times s_{i-1} + (1-\alpha) \times \frac{n}{\Delta t},$$

wherein $s_i$ represents the speech speed at the second moment, $s_{i-1}$ represents the speech speed at the first moment, n represents the text word number, $\Delta t$ represents the target unit time, and $\alpha$ represents the smoothing factor; and when the computer readable instructions are configured to cause the processor to perform obtaining, through calculation, the second threshold according to the speech speed at the second moment, the preset speech speed range, and the second preset speech duration, the computer readable instructions are configured to cause the processor to perform:

calculating the second threshold by using the following manner:

$$T = f_1(s) = T_1 \times \left( \max\left( \min\left( \frac{S_{high} - S_i}{S_{high} - S_{low}}, 1 \right), 0 \right) + 0.5 \right),$$

wherein T represents the second threshold, $f_1(s)$ represents a second threshold calculation function, $T_1$ represents the second preset speech duration, $S_{high}$ represents a maximum value in the preset speech speed range, $S_{low}$ represents a minimum value in the preset speech speed range, and $S_i$ represents the speech speed at the second moment.

* * * * *